US008099427B2

(12) United States Patent
Tanigawa et al.

(10) Patent No.: US 8,099,427 B2
(45) Date of Patent: Jan. 17, 2012

(54) SEARCH ARTICLE ESTIMATION APPARATUS AND METHOD AND SERVER FOR SEARCH ARTICLE ESTIMATION APPARATUS

(75) Inventors: Toru Tanigawa, Kyoto (JP); Shusaku Okamoto, Kanagawa (JP); Osamu Yamada, Nara (JP); Tomonobu Naruoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 1025 days.

(21) Appl. No.: 11/796,723

(22) Filed: Apr. 27, 2007

(65) Prior Publication Data

US 2007/0208736 A1 Sep. 6, 2007

Related U.S. Application Data

(63) Continuation of application No. PCT/JP2006/315413, filed on Aug. 3, 2006.

(30) Foreign Application Priority Data

Aug. 4, 2005 (JP) .................................. 2005-226654
Aug. 3, 2006 (JP) .................................. 2006-211567

(51) Int. Cl.
*G06F 7/00* (2006.01)
*G06F 17/30* (2006.01)
(52) U.S. Cl. ........................................ 707/769; 707/792
(58) Field of Classification Search ............... 707/999.2, 707/724, 725, 769
See application file for complete search history.

(56) References Cited

U.S. PATENT DOCUMENTS

| 6,796,799 | B1 | 9/2004 | Yoshiike et al. | |
| 7,206,668 | B2* | 4/2007 | Okamoto et al. | ............ 700/245 |
| 2002/0183979 | A1* | 12/2002 | Wildman | ..................... 702/188 |
| 2003/0069900 | A1* | 4/2003 | Hind et al. | ..................... 707/200 |

FOREIGN PATENT DOCUMENTS

JP 2001-34869 A 2/2001

(Continued)

OTHER PUBLICATIONS

Ichiro Tsuchio, "Smart Drawers: Kagu ni yoru Genjitsu Sekai Interaction", The Institute of Electronics, Information and Communication Engineers Sogo Taikai Koen Ronbunshu, The Institute of Electronics, Information and Communication Engineers, Mar. 7, 2001, p. 138.

(Continued)

*Primary Examiner* — Apu Mofiz
*Assistant Examiner* — Mohammad Rahman
(74) *Attorney, Agent, or Firm* — Harness, Dickey & Pierce, P.L.C.

(57) ABSTRACT

A search article estimation apparatus is provided that is capable of estimating an article that a user is trying to search for, even when the user cannot accurately provide information on the article that the user wants to search for. The state of access to a storage equipment by the user and a change in articles in the storage equipment during the access are checked by a sensing apparatus. If there is no change in articles, then a search state detection means determines that the user has performed an article search but has been unable to find the article. Furthermore, a search article estimation means refers to a storage location database and estimates an article that should originally be stored in the storage equipment, to be the article that the user is searching for.

1 Claim, 32 Drawing Sheets

FOREIGN PATENT DOCUMENTS

| | | |
|---|---|---|
| JP | 2002-250768 A | 9/2002 |
| JP | 2003-233715 A | 8/2003 |
| JP | 2003-256648 A | 9/2003 |
| JP | 2004-326437 A | 11/2004 |

OTHER PUBLICATIONS

Tetsuya Fujii, Hirotada Ueda, Michihiko Mino, "Kateinai Ubiquitous Kankyo ni Okeru Sagashimono Service ni Kansuru Kento", FIT2004 Dai 3 Kai Forum on Information Technology Ippan Koen Ronbunshu, separate vol. 4, the Institute of Electronics, Information and Communication Engineers, Shadan Hojin Information Processing Society of Japan, Aug. 20, 2004, p. 203-204.

* cited by examiner

Fig.5
| ARTICLE ID | ARTICLE NAME | WEIGHT | APPEARANCE |
|---|---|---|---|
| ID001 | MOBILE PHONE | 200g |  |
| ID002 | WALLET | 160g |  |
| ID003 | CUP | 100g |  |
| ID004 | CUP | 130g |  |
| ID005 | BOOK | 350g | 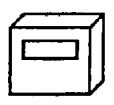 |
| ID006 | MAGAZINE | 250g | 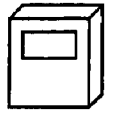 |
| ID007 | STAPLER | 50g | 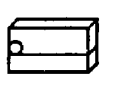 |
| ID008 | SCISSORS | 70g | 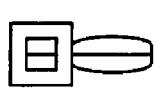 |
| ID009 | SCISSORS | 50g | 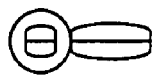 |

Fig.6

| STORAGE LOCATION ID | STORAGE LOCATION NAME | ARTICLE ID |
|---|---|---|
| IDP001 | MULTIPURPOSE CABINET | ID001、ID002 |
| IDP002 | CUPBOARD | ID003、ID004 |
| IDP003 | BOOKSHELF | ID005、ID006 |
| IDP004 | STATIONERY CASE | ID007、ID008、ID009 |
| IDP005 | SINK | — |
| IDP006 | SOFA 1 | — |
| IDP007 | SOFA 2 | — |
| IDP008 | DINING TABLE | — |
| IDP009 | TABLE | — |

Fig.7

| ARTICLE ID | CURRENT STORAGE LOCATION (DISAPPEARANCE/DETECTION TIME) | PREVIOUS STORAGE LOCATION (DISAPPEARANCE/DETECTION TIME) | STORAGE LOCATION BEFORE PREVIOUS STORAGE LOCATION (DISAPPEARANCE/DETECTION TIME) | ... |
|---|---|---|---|---|
| ID001 | TABLE (--/17:22) | DINING TABLE (17:20/17:10) | TABLE (17:08/14:03) | ... |
| ID002 | MULTIPURPOSE CABINET (--/18:29) | TABLE (18:27/18:10) | MULTIPURPOSE CABINET (17:02/13:12) | ... |
| ID003 | TABLE (--/15:10) | SINK (15:08/12:55) | DINING TABLE (12:54/12:01) | ... |
| ID004 | DINING TABLE (--/19:39) | CUPBOARD (19:38/13:27) | SINK (13:22/11:49) | ... |
| ID005 | BOOKSHELF (--/11:33) | TABLE (11:31/10:21) | BOOKSHELF (10:19/8:09) | ... |
| ID006 | TABLE (--/14:26) | BOOKSHELF (14:24/9:44) | TABLE (9:43/7:22) | ... |
| ID007 | STATIONERY CASE (--/20:33) | TABLE (20:30/17:12) | STATIONERY CASE (17:08/10:58) | ... |
| ID008 | MULTIPURPOSE CABINET (--/20:32) | DINING TABLE (20:31/11:07) | TABLE (11:05/10:21) | ... |
| ID009 | CUPBOARD (--/8:03) | TABLE (8:02/7:55) | STATIONERY CASE (7:50/7:32) | ... |

Fig.8

| ARTICLE ID | STORAGE LOCATION BETWEEN 0 A.M. AND 1 A.M. | ... | STORAGE LOCATION BETWEEN 1 P.M. AND 2 P.M. | STORAGE LOCATION BETWEEN 2 P.M. AND 3 P.M. | STORAGE LOCATION BETWEEN 3 P.M. AND 4 P.M. | ... | STORAGE LOCATION BETWEEN 11 P.M. AND 0 A.M. |
|---|---|---|---|---|---|---|---|
| ID001 | MULTIPURPOSE CABINET | ... | OUTSIDE HOME | OUTSIDE HOME | OUTSIDE HOME | ... | TABLE |
| ID002 | MULTIPURPOSE CABINET | ... | OUTSIDE HOME | OUTSIDE HOME | OUTSIDE HOME | ... | SAFE |
| ID003 | CUPBOARD | ... | DINING TABLE | SINK | SINK | ... | CUPBOARD |
| ID004 | CUPBOARD | ... | DINING TABLE | SINK | SINK | ... | CUPBOARD |
| ID005 | BOOKSHELF | ... | BOOKSHELF | BOOKSHELF | BOOKSHELF | ... | TABLE |
| ID006 | BOOKSHELF | ... | TABLE | BOOKSHELF | BOOKSHELF | ... | TABLE |
| ID007 | STATIONERY CASE | ... | STATIONERY CASE | TABLE | STATIONERY CASE | ... | STATIONERY CASE |
| ID008 | STATIONERY CASE | ... | TABLE | STATIONERY CASE | STATIONERY CASE | ... | STATIONERY CASE |
| ID009 | STATIONERY CASE | ... | TABLE | STATIONERY CASE | STATIONERY CASE | ... | STATIONERY CASE |

*Fig.9*

| ARTICLE ID | FIRST OWNER ID | SECOND OWNER ID | THIRD OWNER ID |
|---|---|---|---|
| ID001 | U001 | — | — |
| ID002 | U002 | — | — |
| ID003 | U003 | — | — |
| ID004 | U001 | U002 | U004 |
| ID005 | U002 | U001 | — |
| ID006 | U004 | U003 | — |
| ID007 | U003 | U004 | U002 |
| ID008 | U003 | U002 | U001 |
| ID009 | U004 | — | — |

Fig.10A

| USER NAME | USER ID | BODY HEIGHT | BODY WEIGHT |
|---|---|---|---|
| FATHER | U001 | 175cm | 83Kg |
| MOTHER | U002 | 158cm | 48Kg |
| OLDER SISTER | U003 | 143cm | 33Kg |
| YOUNGER BROTHER | U004 | 133cm | 25Kg |

Fig.10B

| USER NAME | USER ID | BODY HEIGHT | BODY WEIGHT | AVERAGE FIND TIME FOR ARTICLE SEARCH |
|---|---|---|---|---|
| FATHER | U001 | 175cm | 83Kg | 20 SECONDS |
| MOTHER | U002 | 158cm | 48Kg | 10 SECONDS |
| OLDER SISTER | U003 | 143cm | 33Kg | 20 SECONDS |
| YOUNGER BROTHER | U004 | 133cm | 25Kg | 40 SECONDS |

*Fig.11A*

| STORAGE EQUIPMENT | OPERATION TIME | ACCESS STATE ESTIMATION INFORMATION | ACCESS STATE INFORMATION |
|---|---|---|---|
| BOOKSHELF | : | : | : |
| | 19:31 | OPEN | ACCESSING |
| | 19:32 | CLOSED | NOT ACCESSING |

*Fig.11B*

| STORAGE EQUIPMENT | OPERATION TIME | ACCESS STATE ESTIMATION INFORMATION | ACCESS STATE INFORMATION |
|---|---|---|---|
| MULTIPURPOSE CABINET | : | : | : |
| | 19:10 | OPEN | ACCESSING |
| | 19:14 | CLOSED | NOT ACCESSING |

*Fig.11C*

| STORAGE EQUIPMENT | OPERATION TIME | ACCESS STATE ESTIMATION INFORMATION | ACCESS STATE INFORMATION |
|---|---|---|---|
| CUPBOARD | : | : | : |
| | 18:14 | OPEN | ACCESSING |
| | 18:20 | CLOSED | NOT ACCESSING |

*Fig.11D*

| STORAGE EQUIPMENT | OPERATION TIME | ACCESS STATE ESTIMATION INFORMATION | ACCESS STATE INFORMATION |
|---|---|---|---|
| STATIONERY CASE | : | : | : |
| | 21:02 | OPEN | ACCESSING |
| | 21:04 | CLOSED | NOT ACCESSING |

*Fig.12B*

| EQUIPMENT | OPERATION TIME | STATE |
|---|---|---|
| STATIONERY CASE | ⋮ | ⋮ |
| | 19:31 | OPEN |
| | 19:32 | CLOSED |
| | ⋮ | ⋮ |

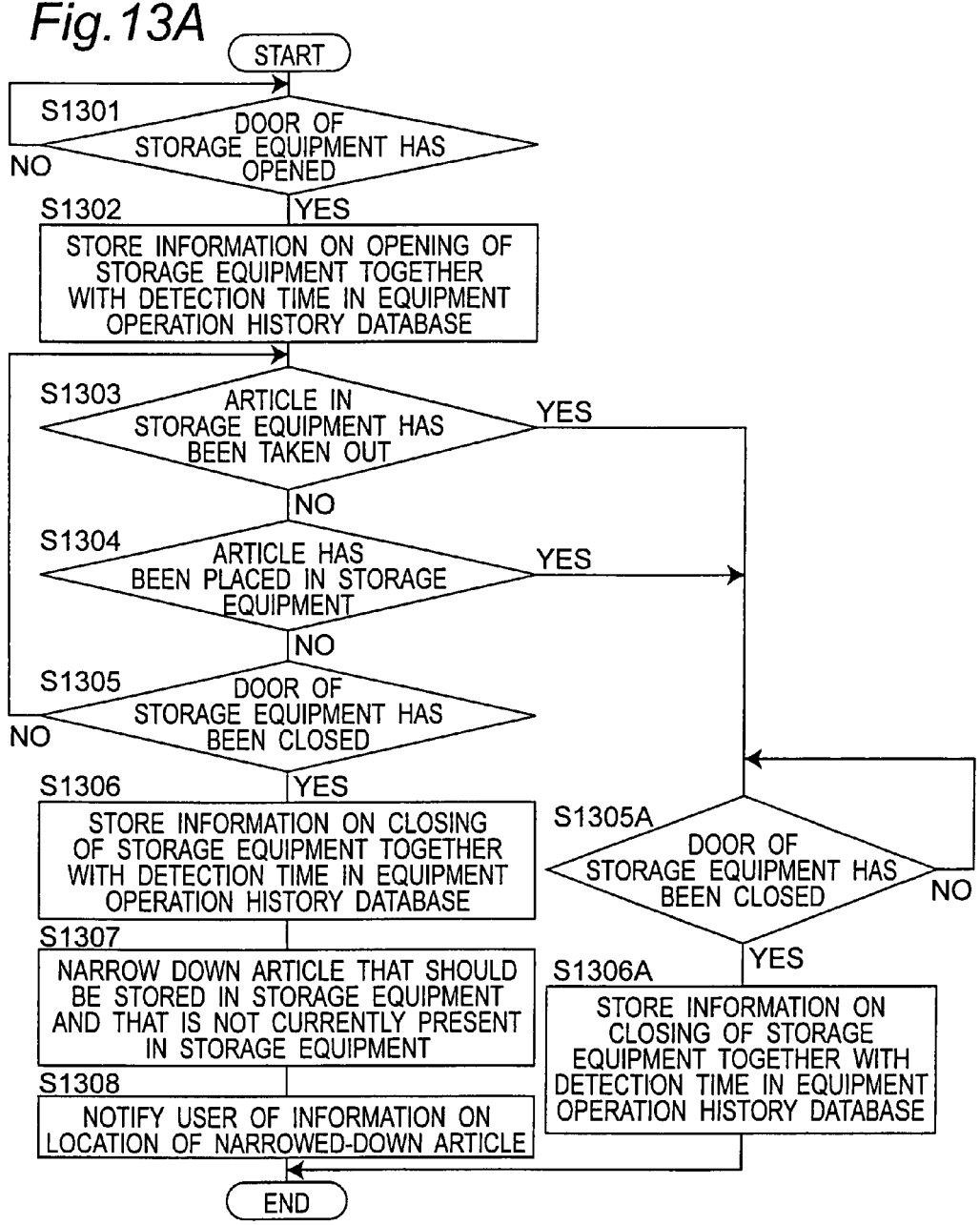

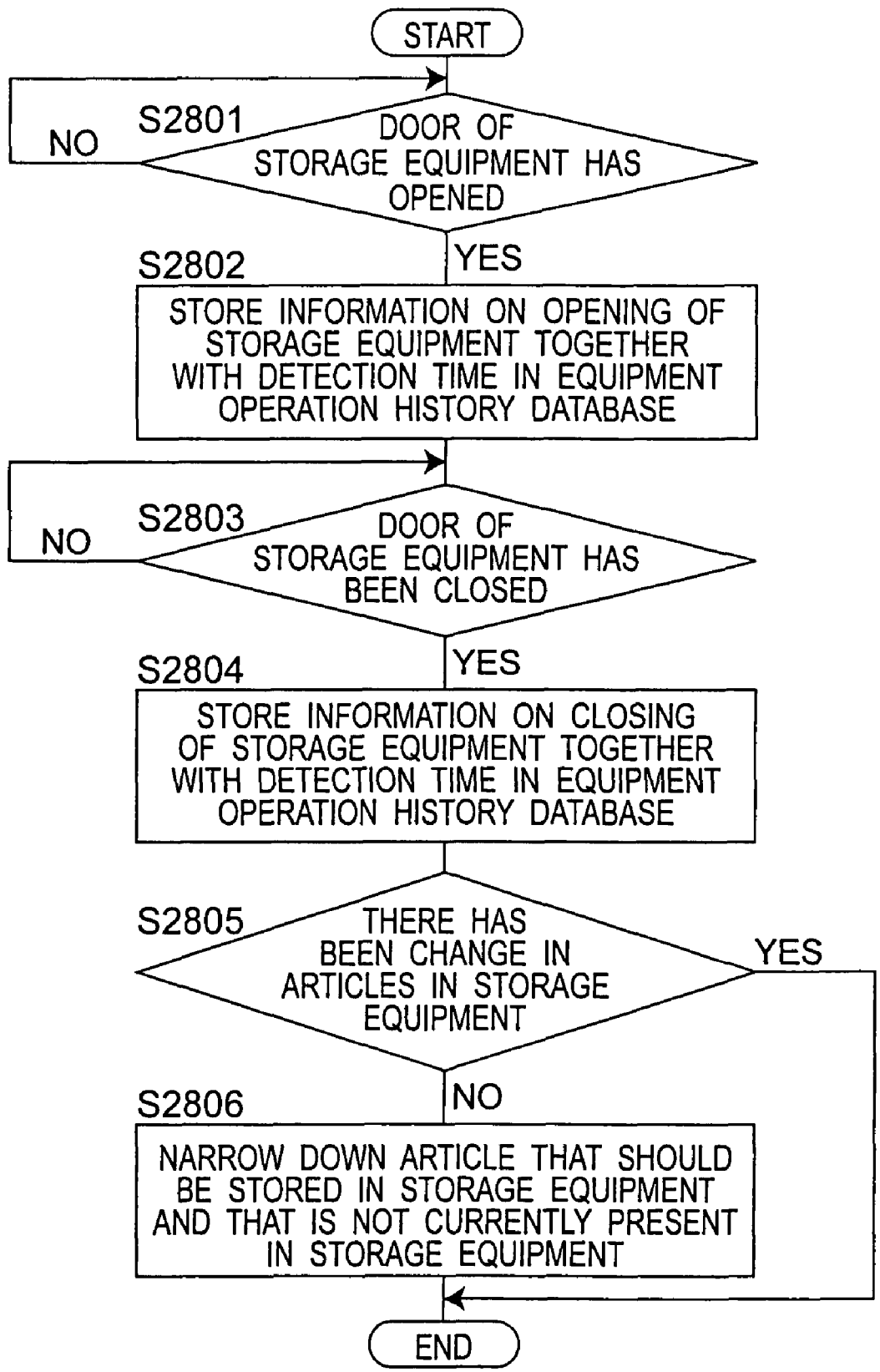

Fig.23C

| EQUIPMENT | OPERATION TIME | STATE | DETECTION STATE OF TAG 2317 |
|---|---|---|---|
| STATIONERY CASE | : | : | : |
| | 23:45 | OPEN | BA2305,BB2306 BC2307,BD2308 |

Fig.23D

| SENSING APPARATUS | SENSOR ID | INSTALLED EQUIPMENT | INSTALLATION COORDINATES |
|---|---|---|---|
| TAG READER AA | Tag_001AA | STATIONERY CASE | (3100,250),(3450,50) |
| TAG READER AB | Tag_001AB | STATIONERY CASE | (2750,250),(3100,50) |
| ... | ... | ... | ... |
| TAG READER DC | Tag_001DC | STATIONERY CASE | (2400,850),(2750,650) |
| TAG READER DD | Tag_001DD | STATIONERY CASE | (2050,850),(2400,850) |

Fig. 24
| ARTICLE ID | ARTICLE NAME | WEIGHT | APPEARANCE | ASSOCIATED ARTICLE |
|---|---|---|---|---|
| ID001 | MOBILE PHONE | 200g |  | ID002 |
| ID002 | WALLET | 160g |  | ID001 |
| ID003 | CUP | 100g |  | ID020 (JUICE)<br>ID021 (MINERAL WATER) |
| ID004 | CUP | 130g | 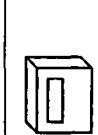 | ID022 (COFFEE) |
| ID005 | BOOK | 350g | 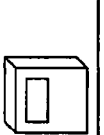 | |
| ID006 | MAGAZINE | 250g |  | |
| ID007 | STAPLER | 50g |  | ID015 (STAPLE) |
| ID008 | SCISSORS | 70g |  | |
| ID009 | SCISSORS | 50g |  | |

Fig.27

| STORAGE LOCATION ID | STORAGE LOCATION NAME | ARTICLE ID |
|---|---|---|
| IDP001 | MULTIPURPOSE CABINET | ID001, ID002, ID007 |
| IDP002 | CUPBOARD | ID003, ID004 |
| IDP003 | BOOKSHELF | ID005, ID006 |
| IDP004 | STATIONERY CASE | ID007, ID008, ID009 |
| IDP005 | SINK | — |
| IDP006 | SOFA 1 | — |
| IDP007 | SOFA 2 | — |
| IDP008 | DINING TABLE | — |
| IDP009 | TABLE | — |

SEARCH ARTICLE ESTIMATION APPARATUS AND METHOD AND SERVER FOR SEARCH ARTICLE ESTIMATION APPARATUS

This is a continuation application of International Application No. PCT/JP2006/315413, filed Aug. 3, 2006.

BACKGROUND OF THE INVENTION

The present invention relates to search article estimation apparatus and method that estimate an article that a user is searching for in an environment in which tag readers, cameras, contact sensors, or the like are disposed, and a server for the search article estimation apparatus.

Conventionally, when estimating an article which is a search target in response to some input from a user, it is common practice to use the name or ID of the article, a keyword indicating the article, a synonym for the article, or the like. For example, in Patent Document 1, when a user does not remember the name of a search article, by inputting a keyword indicating the search article instead of inputting the name, from a keyboard, the search article is estimated (see Patent Document 1, for example).

Patent Document 1: Japanese Unexamined Patent Publication No. 2002-250768

However, in the aforementioned Patent Document 1, each time a user allows an article search system to search for an article, the user needs to purposefully input information on a search article to the article search system. Here, considering a case in which, for example, an article search is performed at general home, normally, there are such a large number of articles at home that a person cannot grasp and among them there are a lot of articles having the same name, such as cups. It is troublesome to perform, in order to distinguish between such articles with the same name, the process of assigning keywords to the individual articles, and moreover, it is not sure if the user can accurately remember the assigned keywords.

The present invention is made in view of the above-described issues. An object of the present invention is to provide search article estimation apparatus and method, and a server for the search article estimation apparatus, in which, even when a user cannot accurately provide the search article estimation apparatus with information on an article that the user wants to search for, the article that the user is trying to search for can be estimated.

SUMMARY OF THE INVENTION

To achieve the above-described object, the present invention is composed as follows.

The present invention provides a search article estimation apparatus comprising:

an article information database for storing therein article information necessary to estimate an article;

a storage location database for storing therein a storage location of the article stored in the article information database;

a sensing apparatus that is disposed in a living environment, for detecting at least article location information by which a location of the article can be estimated, and access state estimation information by which a state of access, by a user, to a storage equipment at the storage location of the article can be estimated, a timer for obtaining a time;

an environment database for storing therein a map of the environment and installation locations of the storage equipment and the sensing apparatus which are disposed in the environment;

an information processing means for obtaining, based on the installation location of the sensing apparatus stored in the environment database, the article location information and the access state estimation information which are detected by the sensing apparatus, and the time obtained by the timer, information on a location of the article at a time at which the sensing apparatus detects the article location information and the access state estimation information, and access state information that indicates a state of access to the storage equipment by the user;

an article location history database for storing therein the information on the location of the article obtained by the information processing means, together with the time at which the sensing apparatus detects the article location information;

an equipment operation history database for storing therein the access state information that indicates the state of access to the storage equipment by the user and that is obtained by the information processing means, together with the time at which the sensing apparatus detects the access state estimation information;

a search state detection means for detecting, when the user searches for the article by the access to the storage equipment, whether there is a change in article presence/absence in the storage equipment between when the access to the storage equipment is started and when the access to the storage equipment ends; and a search article estimation means for estimating, when the search state detection means detects that there is no change in the article presence/absence in the storage equipment, the article that the user is searching for, by referring to the storage location database, the article location history database, and the equipment operation history database.

As described above, according to the present invention, by a configuration in which the state of access to storage equipment by the user and article change in the storage equipment during the access is checked and if there is no article change, then it is determined that an article that the user is searching for is not present in the storage equipment and thus by further referring to a storage location database, an article that should originally be stored in the storage equipment is estimated to be the article that the user is searching for, the article that the user is searching for can be automatically estimated from a user's search state.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5 is a view showing an example of an article information database of the search article estimation apparatus according to the first embodiment of the present invention;

FIG. 6 is a view showing an example of a storage location database of the search article estimation apparatus according to the first embodiment of the present invention;

FIG. 7 is a view showing an example of an article location history database of the search article estimation apparatus according to the first embodiment of the present invention;

FIG. 8 is a view showing an example of the storage location database of the search article estimation apparatus according to the first embodiment of the present invention;

FIG. 9 is a view showing an example of an owner database of the search article estimation apparatus according to the third embodiment of the present invention;

FIG. 10A is a view showing an example of a user information database of the search article estimation apparatus according to the third embodiment of the present invention;

FIG. 10B is a view showing an example of the user information database of the search article estimation apparatus according to the third embodiment of the present invention;

FIG. 11A is a view showing an example of an equipment operation history database of the search article estimation apparatus according to the first embodiment of the present invention;

FIG. 11B is a view showing an example of the equipment operation history database of the search article estimation apparatus according to the first embodiment of the present invention;

FIG. 11C is a view showing an example of the equipment operation history database of the search article estimation apparatus according to the first embodiment of the present invention;

FIG. 11D is a view showing an example of the equipment operation history database of the search article estimation apparatus according to the first embodiment of the present invention;

FIG. 12B is a view showing, in a table format, results of detection by the contact sensors of FIG. 12A in the sensing apparatus of the search article estimation apparatus according to the first embodiment of the present invention;

FIG. 12D is a view showing, in a table format, results of detection by the pyroelectric infrared sensor of FIG. 12C in the sensing apparatus of the search article estimation apparatus according to the first embodiment of the present invention;

FIG. 13A is a flowchart showing a search article estimation process to be applied to a storage equipment having an open/close function in the search article estimation apparatus according to the first embodiment of the present invention;

FIG. 21 is a flowchart used when, in the search article estimation process of the search article estimation apparatus according to the first embodiment of the present invention, a user cannot see well inside a storage equipment and thus takes front articles out of the storage equipment once and then searches for an article inside the storage equipment;

FIG. 23C is a view showing an example of an equipment operation history database to be used when a display is used for a notification apparatus of the search article estimation apparatus according to the second embodiment of the present invention;

FIG. 23D is a view showing a relationship among sensing apparatuses, sensor IDs, installed equipments, and installation coordinates (installation location coordinates) when the display is used for the notification apparatus of the search article estimation apparatus according to the second embodiment of the present invention;

FIG. 24 is a view showing an example of an article information database of a search article estimation apparatus according to a fourth embodiment of the present invention;

FIG. 27 is a view showing another example of the storage location database of the search article estimation apparatuses according to the first to fifth embodiments of the present invention.

DETAILED DESCRIPTION OF THE PREFERRED EMBODIMENTS

Figure 1:
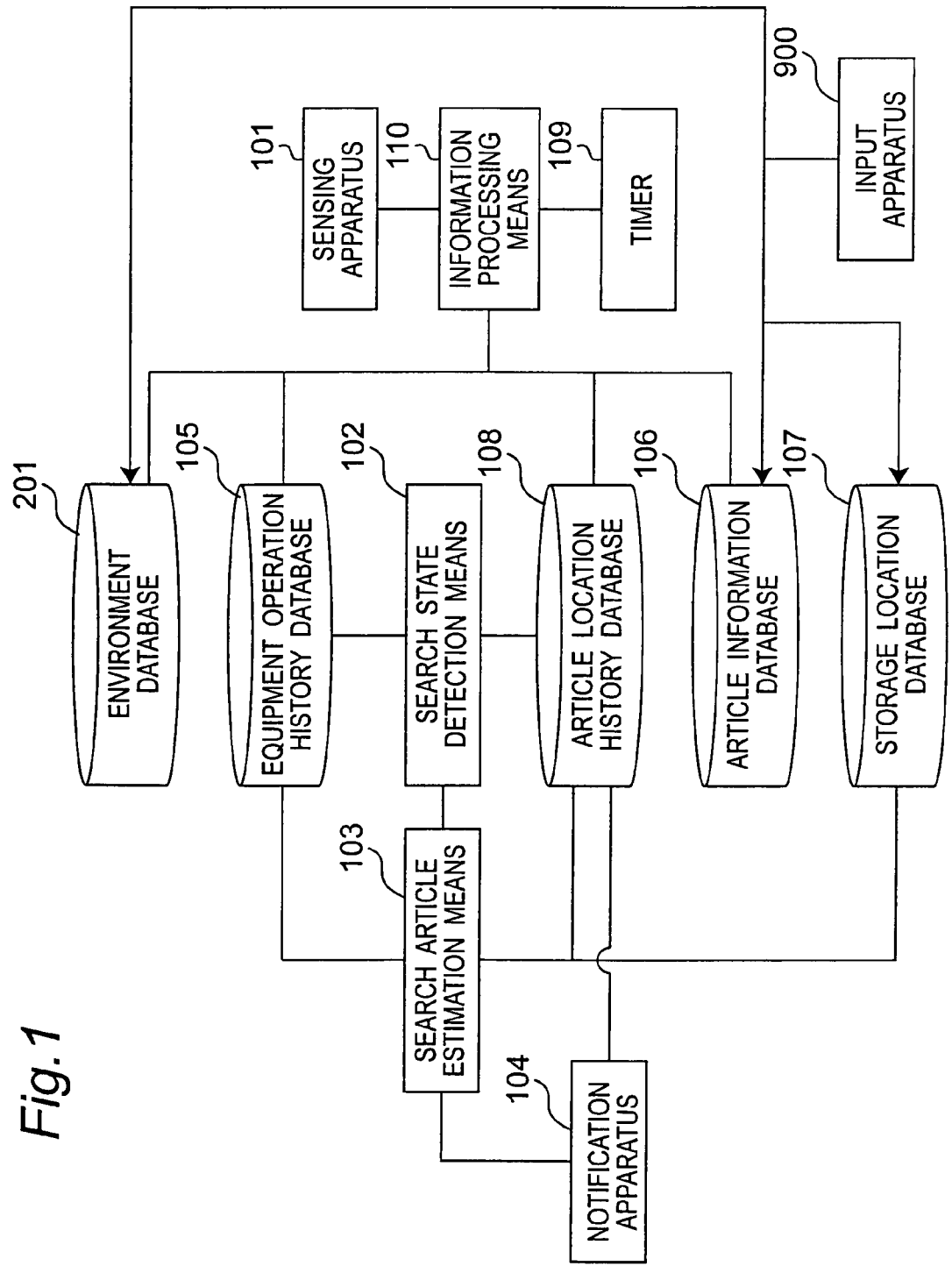
FIG. 1 is a block diagram showing a configuration of a search article estimation apparatus according to a first embodiment of the present invention.

Before the description of the present invention proceeds, it is to be noted that like parts are designated by like reference numerals throughout the accompanying drawings.

Prior to the detailed description of embodiments of the present invention based upon the drawings, various aspects for the present invention will be explained.

According to a first aspect of the present invention, there is provided a search article estimation apparatus comprising:

an article information database for storing therein article information necessary to estimate an article;

a storage location database for storing therein a storage location of the article stored in the article information database;

a sensing apparatus that is disposed in a living environment, for detecting at least article location information capable of estimating a location of the article, and access state estimation information capable of estimating a state of access, by a user, to a storage equipment at the storage location of the article, a timer for obtaining a time;

an environment database for storing therein a map of the environment and installation locations of the storage equipment and the sensing apparatus which are disposed in the environment;

an information processing means for determining, based on the installation location of the sensing apparatus stored in the environment database, the article location information and the access state estimation information which are detected by the sensing apparatus, and the time obtained by the timer, information on a location of the article at a time at which the sensing apparatus detects the article location information and the access state estimation information, and access state information that indicates a state of access to the storage equipment by the user;

an article location history database for storing therein the information on the location of the article determined by the information processing means, together with the time at which the sensing apparatus detects the article location information;

an equipment operation history database for storing therein the access state information that indicates the state of access to the storage equipment by the user and that is obtained by the information processing means, together with the time at which the sensing apparatus detects the access state estimation information;

a search state detection means for detecting, when the user searches for the article by the access to the storage equipment, whether there is a change in article presence/absence in the storage equipment between when the access to the storage equipment is started and when the access to the storage equipment ends; and a search article estimation means for estimating, when the search state detection means detects that there is no change in the article presence/absence in the storage equipment, the article that the user is searching for, by referring to the storage location database, the article location history database, and the equipment operation history database.

According to the configuration, the state of access to the storage equipment by the user and article change in the storage equipment during the access is checked. If there is no change in article, then it is determined that the article that the user is searching for is not present in the storage equipment. Thus, by further referring to the storage location database, the article that should originally be stored in the storage equipment is estimated to be the article that the user is searching for. Therefore, the article that the user is searching for can be automatically estimated from a user's search state.

According to a second aspect of the present invention, there is provided the search article estimation apparatus according to the first aspect, wherein the sensing apparatus further detects an open/close state of an open/close function provided to the storage equipment, the search article estimation apparatus further comprises a hard-to-see area estimation means for estimating an area of the storage equipment that is hard for the user to see, according to a degree of opening and closing of the open/close function during a period of time from when the user starts the access to the storage equipment until the user ends the access, the degree of opening and closing being detected by the sensing apparatus, and the search article estimation means estimates the article that the user is searching for, by further referring to a result of the estimation made by the hard-to-see area estimation means.

According to the configuration, an area of the storage equipment that the user cannot see is estimated by how far a door or drawer of the storage equipment is open and taking into account the possibility that the user may overlook articles in that area, an article that the user is searching for can be estimated.

According to a third aspect of the present invention, there is provided the search article estimation apparatus according to the first or second aspect, further comprising:

a user information database for storing therein a user ID of the user and user information necessary to estimate the user ID; and an owner database for storing therein information on an owner of the article stored in the article information database, wherein the sensing apparatus further detects the user information by which the user can be estimated, the information processing means further estimates the user ID by referring to the user information database based on the user information detected by the sensing apparatus, and the search article estimation means estimates the article that the user is searching for, by further referring to the user ID and the information on the owner of the article stored in the owner database.

According to the configuration, a current user can be identified and the article that the user is searching for can be narrowed down from belongings of the user, and thus, personal matching article estimation can be made.

According to a fourth aspect of the present invention, there is provided the search article estimation apparatus according to any one of the first to third aspects, wherein the article information database further stores therein information on an article combination of a plurality of articles.

According to the configuration, based on belongings of a current user, the article that the user is searching for can be estimated.

According to a fifth aspect of the present invention, there is provided the search article estimation apparatus according to any one of the first to fourth aspects, further comprising a same article search estimation means for estimating whether a search is made for a same single article, based on a period of time from when the access to the storage equipment by the user ends until when access to another storage equipment by the user is started, wherein the search article estimation means estimates the article that the user is searching for, based further on a result of the estimation made by the same article search estimation means.

According to the configuration, when the user cannot find an article and searches pieces of storage equipments at a plurality of locations, it can be estimated that the article that the user is searching for is an article that is in common between the pieces of storage equipments at the plurality of locations where the user has performed a search.

According to a sixth aspect of the present invention, there is provided a server for a search article estimation apparatus, the server comprising:

an article information database for storing therein article information necessary to estimate an article;

a storage location database for storing therein a storage location of the article stored in the article information database;

an environment database for storing therein a map of a living environment and installation locations of an equipment, a storage equipment at the storage location of the article, and the sensing apparatus which are disposed in the environment;

an information processing means for determining, based on the environment database and article location information and access state estimation information which are detected by the sensing apparatus that is disposed in the environment and detects at least the article location information by which a location of the article can be estimated, and the access state estimation information by which a state of access to the storage equipment by a user can be estimated, information on a current location of the article and access state information that indicates information on the state of access to the storage equipment by the user;

an article location history database for storing therein the information on the location of the article determined by the information processing means, together with a time at which the sensing apparatus detects the information;

an equipment operation history database for storing therein the access state information that indicates the state of access to the storage equipment by the user and that is obtained by the information processing means, together with a time at which the sensing apparatus detects the information;

a search state detection means for detecting, when the user searches for the article by the access to the storage equipment, whether there is a change in article presence/absence in the storage equipment between when the access to the storage equipment is started and when the access to the storage equipment ends; and a search article estimation means for estimating, when the search state detection means detects that there is no change in the article presence/absence, the article that the user is searching for, by referring to the storage location database, the article location history database, and the equipment operation history database.

According to the configuration, the server receives from the sensing apparatus information on the state of access to the storage equipment by the user and information on change in article in the storage equipment during the access and determines whether an article that the user is searching for is present in the storage equipment. If it is determined that the article is not present, then, by further referring to the storage location database, an article that should originally be stored in the storage equipment is estimated to be the article that the user is searching for. Thus, the article that the user is searching for can be automatically estimated from a user's search state.

According to a seventh aspect of the present invention, there is provided a search article estimation method comprising:

detecting at least, by a sensing apparatus disposed in a living environment, article location information by which a location of an article can be estimated, and access state estimation information by which a state of access to a storage equipment by a user can be estimated;

obtaining, from an environment database that stores therein the detected article location information and access state estimation information and a map of the environment and installation locations of the storage equipment and the sensing apparatus which are disposed in the environment, a current location of the article and the access state information that indicates the state of access to the storage equipment by the user;

detecting, when the user searches for the article by the access to the storage equipment, whether there is a change in article presence/absence in the storage equipment between when the access to the storage equipment is started and when the access to the storage equipment ends; and estimating the article that the user is searching for.

According to the configuration, the state of access to storage equipment by the user and a change in article in the storage equipment during the access is checked. If there is no change in article, then it is determined that the article that the user is searching for is not present in the storage equipment. Thus, by further referring to the storage location database, an article that should originally be stored in the storage equipment is estimated to be the article that the user is searching for. Therefore, the article that the user is searching for can be automatically estimated from a user's search state.

The embodiments of the present invention will be described below with reference to the drawings.

First Embodiment

FIG. 1 is a block diagram showing a search article estimation apparatus according to a first embodiment of the present invention.

The search article estimation apparatus is composed of an article information database 106, a storage location database 107, a timer 109, a sensing apparatus 101, an information processing means 110, an article location history database 108, an equipment operation history database 105, an environment database 201, a search state detection means 102, a search article estimation means 103, and a notification apparatus 104.

The information processing means 110 is connected to the sensing apparatus 101, the timer 109, the article information database 106, the article location history database 108, the equipment operation history database 105, and the environment database 201. The information processing means 110 performs information processing, such as detection of an article location, by appropriately referring to an installation location of the sensing apparatus 101 which is stored in the environment database 201 and article information stored in the article information database 106, based on detected information which is detected by the sensing apparatus 101, e.g., information such as an ID of an article. The information processing means 110 appropriately stores, together with time information from the timer 109 that obtains a time, the determined article location and the detected information detected by the sensing apparatus 101, e.g., access state estimation information on, for example, an open/close operation (an example of access) of a storage equipment (e.g., a bookshelf, a multipurpose cabinet, a stationery case, or the like, in which articles can be stored or placed), in the article location history database 108 as history information on the article location information. In addition, the information processing means 110 appropriately stores in the equipment operation history database 105 as access state information indicating whether a user is accessing.

The article information database 106 stores therein information on IDs of articles, and article information for article ID estimation that is necessary to estimate the IDs of articles, which are an example of article information necessary to estimate articles present in a living environment (e.g., a house or, a room in the house) or the like.

Here, FIG. 5 shows an example of the article information database 106 of articles present in house, for example. In FIG. 5, as an example of information necessary to estimate the IDs of articles, the names (text data) of articles, the weights (text data) of articles, and the appearances (schematic image data) of articles are stored so as to be associated with the respective IDs of articles.

The storage location database 107 stores therein information on storage locations where the articles stored in the article information database 106 should originally be stored. Here, FIG. 6 shows an example of the storage location database 107 at home, for example. Here, the names of storage locations are provided so as to be associated with IDs of the storage location, and IDs of articles that should originally be stored at their corresponding storage locations are provided but it is assumed that storage locations with the same name are not present. If storage locations with the same name are present in the above-described living environment, IDs may be assigned to the storage locations and the IDs of the storage locations may be stored as storage locations in the storage location database 107. For example, of two sofas in FIG. 6, IDP006 is assigned to one sofa 1 and IDP007 is assigned to the other sofa 2. A plurality of storage locations may be set for a single article. For example, FIG. 27 shows another example of the storage location database 107, in which two pieces of storage equipments, i.e., a multipurpose cabinet (article ID: ID001) and a stationery case (article ID: ID004), are set for a stapler (article ID: ID0007) as the original storage locations.

Note that information stored in the article information database 106 and the storage location database 107 may be directly inputted by a user from an input apparatus 900, such as a touch panel, a keyboard, a mouse, or a microphone, or may be stored by reading information stored in tags attached by manufacturers or distributors of articles, from an input apparatus 900 such as a tag reader.

For the storage location database 107, a plurality of storage locations may be set such that the storage locations of articles change every given period of time. Here, FIG. 8 shows an example of the storage location database 107 in which the storage locations of articles that change every given period of time are stored. By using the storage location database of FIG. 8, it becomes possible to inform the user, when, for example, the user makes a search request for a mobile phone with article ID001 at some time between 2 p.m. and 3 p.m., that the mobile phone is outside home and is not present in the current environment (home).

Although in the example of FIG. 8 the given period of time is divided by hours in a day, the given period of time may be divided between business days and holidays or may be divided by seasons.

The environment database 201 stores therein the layout of a room (or an environment, e.g., a map of the room) in the living environment, the disposition of storage equipments in the living environment, the installation locations of the sensing apparatuses 101, and thus, it becomes possible to determine, in the storage equipments sensed by the sensing apparatuses 101, location coordinates of an article stored in a bookshelf or an article stored in a stationery case, for example.

Figure 4:
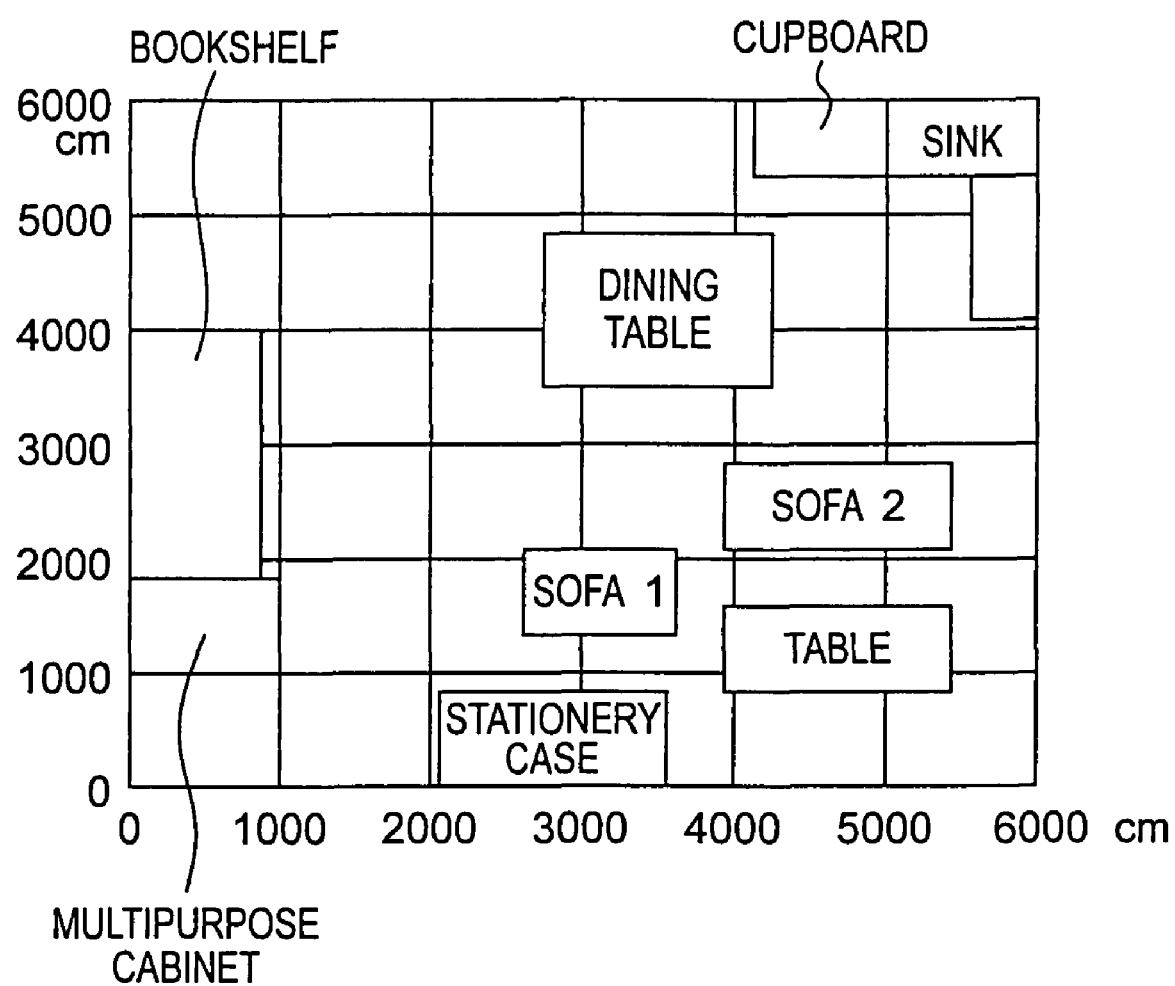
FIG. 4 is a view showing an example of the environment database of the search article estimation apparatus according to the first embodiment of the present invention.
Figure 15:
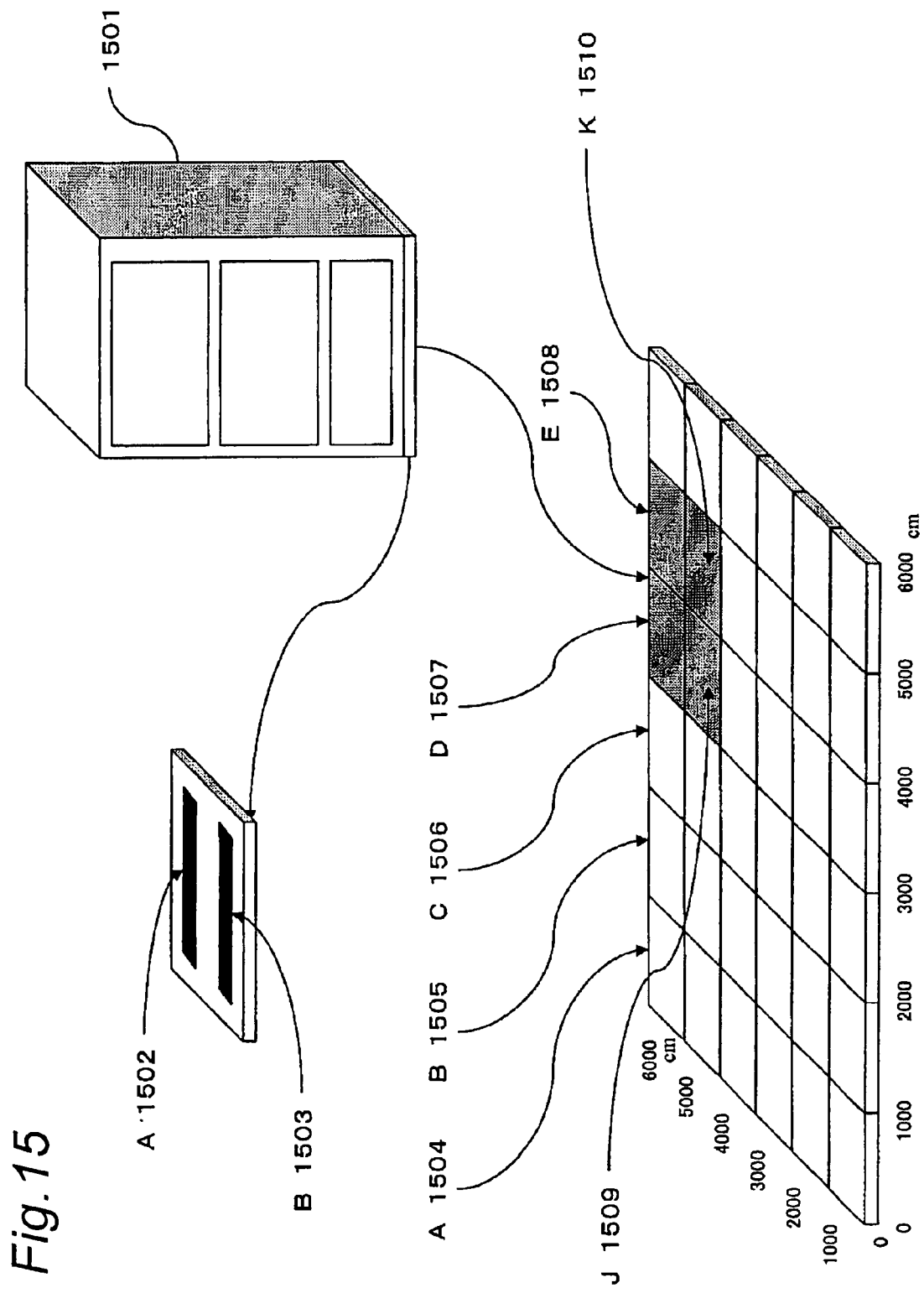
FIG. 15 is a view showing a method of updating the environment database of the search article estimation apparatus according to the first embodiment of the present invention.
Figure 16:
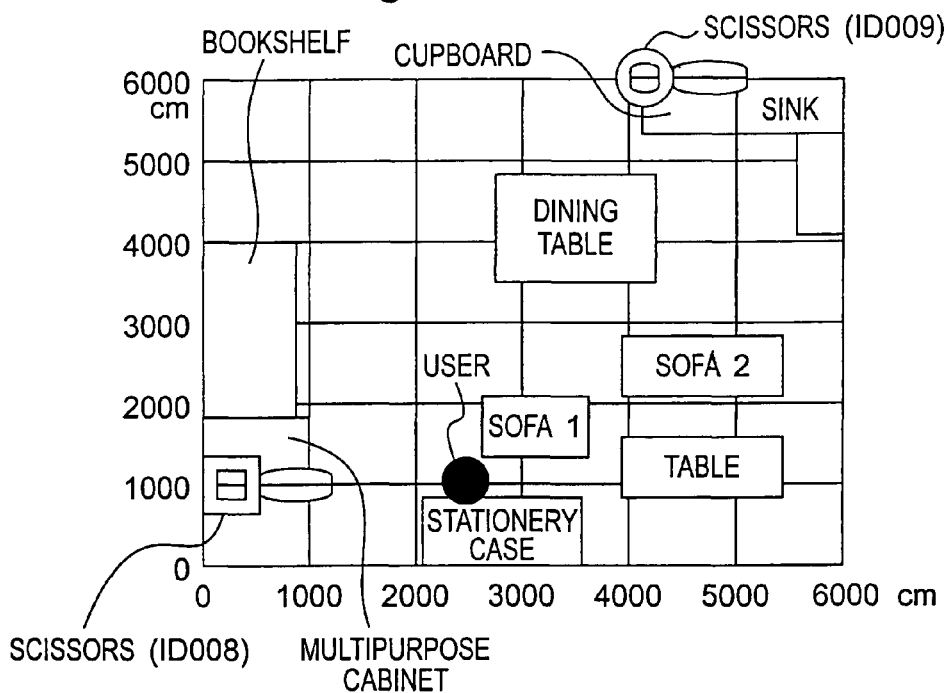
FIG. 16 is a view showing current locations of a user and articles.

Here, FIG. 4 shows a map of an environment and disposition of the storage equipments or the like present in the environment, which are stored in the environment database 201. In the example of FIG. 4, the living environment is displayed smaller than its actual size and the actual size of the living environment is one room in the living environment which is six-by-six meters in size. When changing the disposition of the storage equipments in the living environment, the user may use the input apparatus 900, such as a keyboard, a mouse, or a microphone, to manually update the environment database 201 or may use the sensing apparatus 101, such as a tag reader, and the information processing means 110 to automatically update the environment database 201. Here, using FIG. 15, an automatic update method for the environment database 201 that uses the sensing apparatus 101, such as a tag reader, and the information processing means 110 is shown. As shown in FIG. 15, tag readers A to K (1504 to 1510) which are an example of the sensing apparatus 101 having location coordinate information are spread over a floor of the room in the living environment, and two tags (a rear-side tag A 1502 and a front-side tag B 1503) are attached onto a bottom of each piece of storage equipments, i.e., a cabinet 1501 in the example of FIG. 15. By this, when the cabinet 1501 is installed on the floor, the tag readers D 1507 and E 1508 react to the rear-side tag A 1502 and the tag reader J 1509 and the tag reader K 1510 react to the front-side tag B 1503. Accordingly, it is determined by the information processing means 110 that the cabinet 1501 is installed at a location of the tag reader D 1507, the tag reader E 1508, the tag reader J 1509, and the tag reader K 1510 and with the tag reader J 1509 and the tag reader K 1510 being at the front (installed to be against a wall side of the room). Information on location coordinates of the cabinet 1501 thus obtained is stored and updated in the environment database 201 by the information processing means 110.

Figure 2:
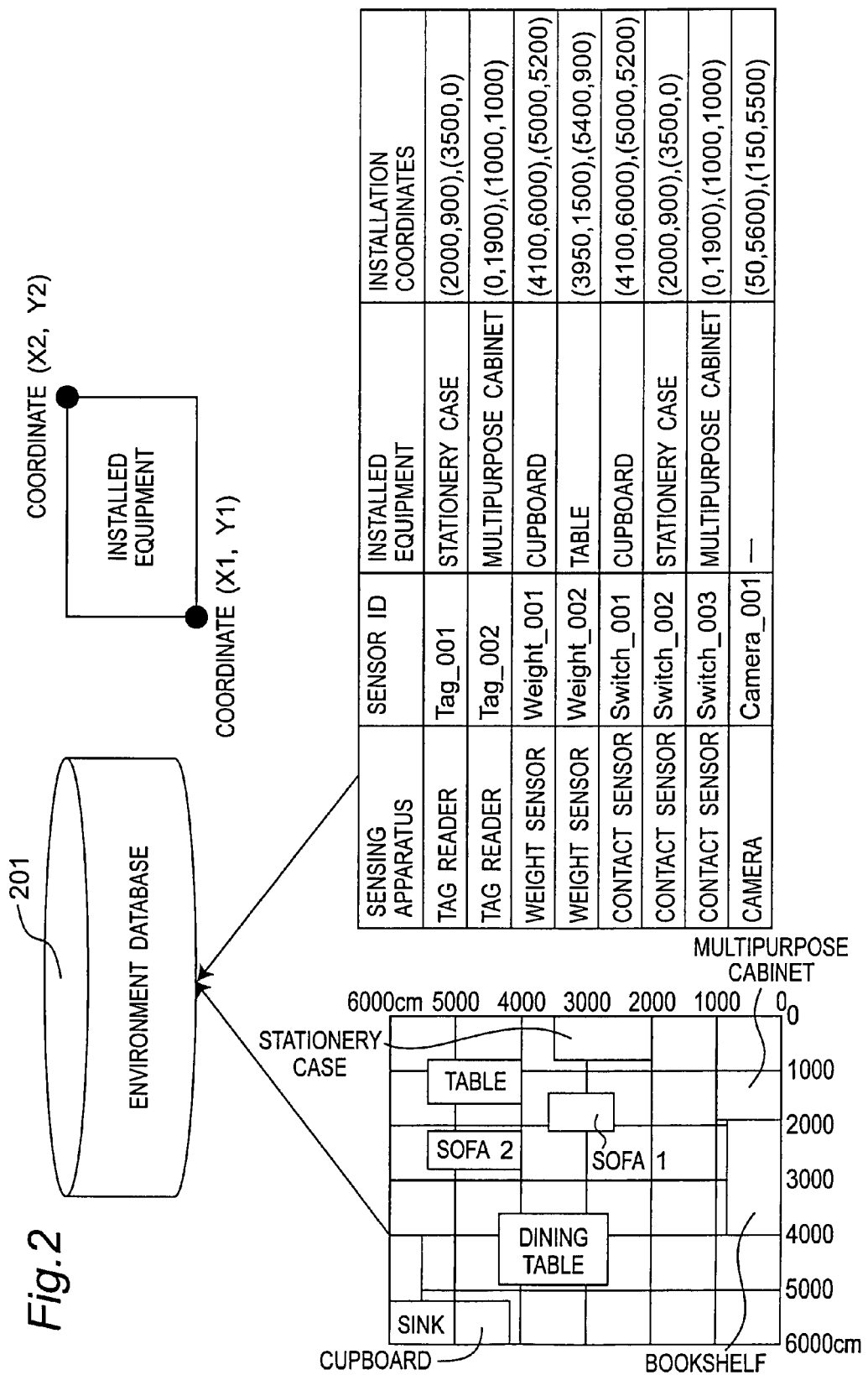
FIG. 2 is a view showing an example of information to be stored in an environment database of the search article estimation apparatus according to the first embodiment of the present invention.

FIG. 2 shows information stored in the environment database 201, including information on installation locations of sensing apparatuses 101 stored in the environment database 201, the map of the environment shown in FIG. 4, and the disposition of storage equipments present in the environment. For example, a tag reader with a sensor ID of Tag_001 indicates that the tag reader is installed on a "stationery case" serving as a storage equipment on which a sensor is installed in a range of location coordinates (2000, 900) to (3500, 0). By this, when performing information processing such as detection of an article location, the information processing means 110 can determine from which sensing apparatus 101 of which location in the environment given information comes from.

The sensing apparatuses 101 are disposed in the living environment and are apparatuses, each of which detects at least article location information by which the location (location coordinates) of an article can be estimated, and access state estimation information, such as open/close information on the storage equipment, by which the state of access to the storage equipment by the user can be estimated. For the sensing apparatuses 101, for example, tag readers, weight sensors, cameras, contact sensors, pyroelectric infrared sensors, or the like are considered. In the environment database 201 there are stored sensor IDs of the respective sensing apparatuses 101, pieces of equipments on which the respective sensing apparatuses 101 are installed, installation coordinates (installation location coordinates) of the respective sensing apparatuses 101. By including the sensor ID of the sensing apparatus 101 in information to be transmitted from the sensing apparatus 101 to the information processing means 110, the information processing means 110 can determine from which sensing apparatus 101 the information comes from.

A description of each sensor which is an example of the sensing apparatus 101 and a description of processing contents of information obtained by each sensor by the information processing means 110 will be made below.

First, an example in which a tag reader is used as a sensing apparatus 101 is described. A tag reader is disposed in the living environment. When a tag is detected by the disposed tag reader, it is determined by the information processing means 110 that there is an article having the tag attached thereto in a sensing range of the tag reader having detected the tag. Here, it is assumed that the sensing range of the tag reader is set only to a given storage location and an article has attached thereto a tag in which the ID of the article is stored. Then, the information processing means 110 performs information processing to detect at which storage location the article stored in the article information database 107 is currently present, by referring to the article information database 106 based on information on the tag detected by the tag reader (information which is an example of article location information, e.g., ID information on the tag) and information on a location where the tag reader is sensing (information which is an example of article location information, e.g., information on the sensing location or range of the tag reader or the center coordinates of the tag reader). Furthermore, when detection of a person is performed using tags, tags with ID information are spread in a lattice configuration, for example, over the floor in the living environment and association data is created in which pieces of the ID information on the tags spread over the floor are associated with locations on the floor. On the other hand, a tag reader for reading the ID information on the tags spread over the floor is installed on footwear. The tag reader stores therein data in which the IDs are associated with sites where the tags having the IDs are placed.

Under such a configuration, when a person walks on the floor in the living environment, at the moment at which a foot steps on the floor, the tag reader attached to the footwear communicates with a tag present underneath the tag reader and reads the ID of the tag. The information processing means 110 checks a value of the ID against the association data and can thereby identify the location of the person on the floor. This is, of course, merely an example and a configuration may be such that tag readers having location information are spread over the floor and tags are attached to a pair of slippers. To support detection of a plurality of persons, IDs owned by the individual persons are distinguished from one another.

To determine, using a tag reader, the state of access to the storage equipment by a user, a tag reader is installed at the front of the storage equipment and information on whether the tag reader is detecting a tag that indicates the user can be used as access state estimation information.

Next, an example in which a weight sensor is used as the sensing apparatus 101 will be described. When the weight sensor is disposed in the living environment, by an increase or decrease in a value of a weight detected by the weight sensor, an article placed on the weight sensor or taken from the weight sensor is determined by the information processing means 110. For example, when the weight sensor has detected a load of +200 g, the information processing means 110 refers to weight data stored in the article information database 106 based on information on the detected load (information which is an example of the article location information) and information on a location sensed by the weight sensor (information which is an example of the article location information, e.g., information on the sensing location or range of the weight sensor, the center coordinates of the weight sensor, or the like) and can thereby detect that a mobile phone is placed on the weight sensor. Alternatively, by spreading weight sensors in a lattice configuration, for example, over the floor in the living environment, detection of a person can also be performed. The weight sensors each are configured to output, when a load is applied by a person's foot or the like, a value of the load and all the weight sensors are connected to the information processing means 110. The information processing means 110 is configured to always receive information sensed by the weight sensors. If it is detected that a load is applied to a given sensor, the information processing means 110 immediately determines location coordinates where the sensor is placed. To most easily find out the location of a person using such a search article estimation apparatus, a coordinate value of a sensor to which a load is applied is directly used as the location of a person. With this, however, when there are a plurality of persons in the environment, an issue arises that the persons cannot be distinguished from one another. To cope with such an issue, for example, a process may be added in which sensing data units having substantially equal sensor loads are grouped and the data units are arranged in order of time. By this, the accuracy of detection of persons can be improved.

To determine the state of access to the storage equipment by the user using the weight sensor, the weight sensor is installed at the front of the storage equipment and information on whether the weight sensor is detecting an equivalent weight to the body weight of the user can be used as access state estimation information.

Next, an example in which a camera is used as the sensing apparatus 101 will be described. When a camera is disposed in the living environment, the information processing means 110 can take out, by a background subtraction, for example, an amount of change in an image in the field of view of the camera. The background subtraction indicates a technique for comparing a reference background image created in advance with a current input image and then taking out a subtraction between the images. Then, by performing matching between a subtraction obtained by the background subtraction and appearance data stored in the article information database 106, an article that has appeared in the field of view of the camera or an article that has disappeared from the field of view of the camera is detected by the information processing means 110. Similarly, detection of a person can also be performed.

Article location information for estimating the location of an article, for the case of using the camera includes, for example, an image obtained by the camera or a subtraction image obtained by a background subtraction, and the location of the subtraction image obtained by the background subtraction. When the state of access to the storage equipment by the user is determined using the camera, information on whether the user has been detected in front of the storage equipment can be used as access state estimation information.

The sensing apparatus 101 may be implemented by a combination of a sensor that obtains article location information by which the location of an article can be estimated, and a sensor that obtains access state estimation information by which the state of access to the storage equipment by the user can be estimated. As a sensor capable of obtaining the access state estimation information, a contact sensor and a pyroelectric infrared sensor will be described below.

Figure 12A:
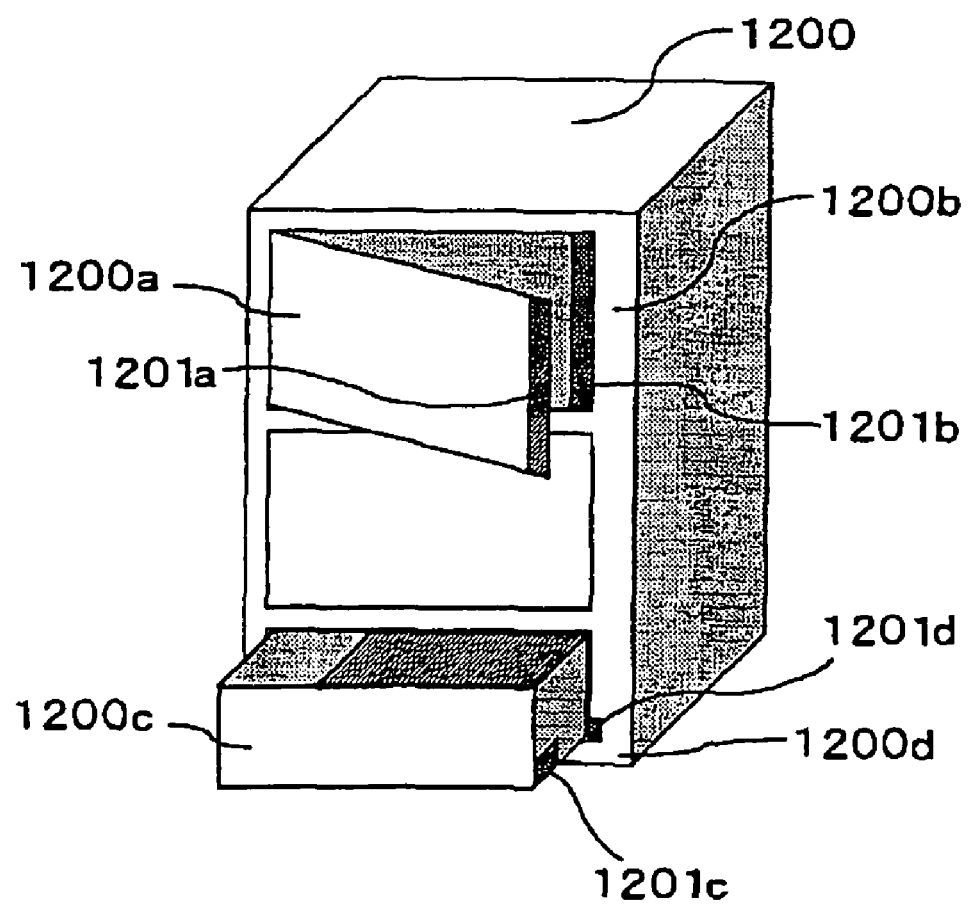
FIG. 12A is a perspective view showing a method of using contact sensors in an example of a sensing apparatus of the search article estimation apparatus according to the first embodiment of the present invention.

An example in which a contact sensor is used as the sensing apparatus 101 will be described using FIGS. 12A and 12B. In FIG. 12A, portions denoted by reference numerals 1201a to 1201d represent contact sensors. Specifically, FIG. 12A shows that the storage equipment, e.g., a stationery case 1200, has two types of open/close doors and the contact sensors 1201a to 1201d are installed on the doors. The upper open/close door of the stationery case 1200 is a door 1200a that opens and closes on a hinge. The contact sensors 1201a and 1201b are installed on an edge of the door 1200a and an edge of a main body portion 1200b facing the edge of the door 1200a, respectively, such that the contact sensors 1201a and 1201b can contact with each other. The lower open/close door of the stationery case 1200 is a drawer 1200c. The contact sensors 1201c and 1201d are installed on an edge of the drawer 1200c and an edge of the main body portion 1200d facing the edge of the drawer 1200c, respectively, such that the contact sensors 1201c and 1201d can contact with each other. By these configurations, the information processing means 110 can calculate information on opening/closing of the doors of the storage equipment such that, as shown in a table format in FIG. 12B, when the contact sensors 1201a and 1201b or the contact sensors 1201c and 1201d contact with each other, the door 12001a or 1200c of the storage equipment is closed and when the contact sensors 1201a and 1201b or the contact sensors 1201c and 1201d go into a non-contact state, the door 1200a or 1200c of the storage equipment is open. Then, information on whether the door is open can be used as the access state estimation information.

Although here as the sensing apparatus 101 an example of the contact sensors 1201a to 1201d is described, other sensors, e.g., optical non-contact sensors, may, of course, be used.

Figure 12C:
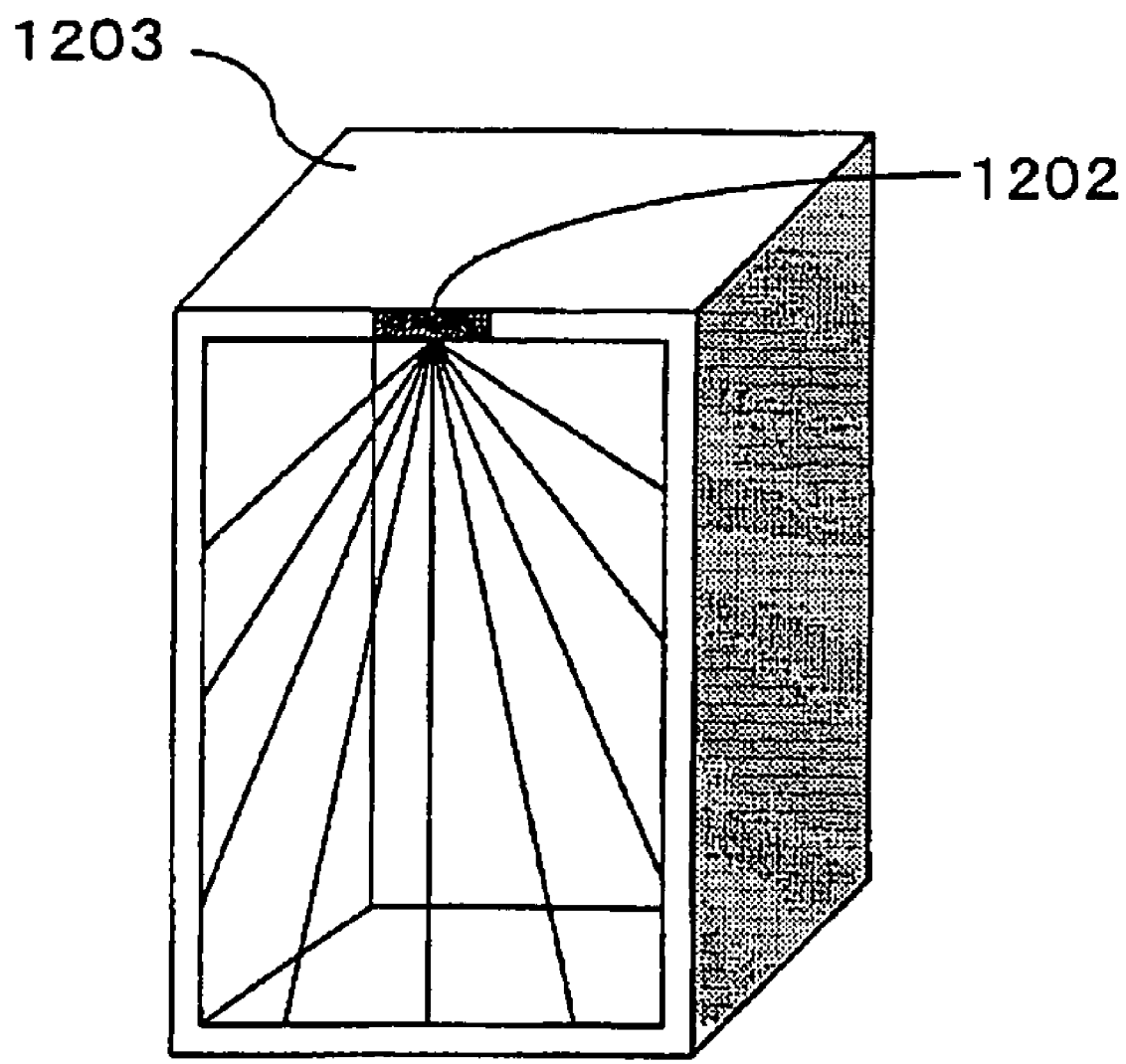
FIG. 12C is a perspective view showing a method of using a pyroelectric infrared sensor in another example of the sensing apparatus of the search article estimation apparatus according to the first embodiment of the present invention.

Next, an example in which a pyroelectric infrared sensor which is an example of an optical non-contact sensor is used as the sensing apparatus 101 will be described using FIGS. 12C and 12D. In FIG. 12C, a portion denoted by reference numeral 1202 represents a pyroelectric infrared sensor installed on a bookshelf 1203 which is an example of the storage equipment. The pyroelectric infrared sensor 1202 can detect a change in temperature by a difference between the temperature of a physical object having a temperature such as a person (the temperature of a physical object having a temperature higher than a background temperature), and the background temperature. For example, by mounting the pyroelectric infrared sensor 1202 on an entry of the bookshelf 1203 and setting the detection range of the pyroelectric infrared sensor 1202 to the entry of the bookshelf 1203, as shown in a table format in FIG. 12D, whether a person is putting his/her hand in the bookshelf 1203 can be detected by the pyroelectric infrared sensor 1202. Then, information on whether the hand is put in the bookshelf 1203 can be used as the access state estimation information.

The article location history database 108 stores therein the ID of an article and a history of locations (location information such as location coordinates) at which the article has been placed so far, including a current location (current location information such as location coordinates) of the article, together with times. Here, FIG. 7 shows an example of the article location history database 108. At the storage locations of a table, a dining table, and a bookshelf described in FIG. 7, those are sensed by the sensing apparatuses 101, and which article is placed at the storage location or which article is taken from the storage location is detected by the sensing apparatuses 101. For example, take a look at ID001 (mobile phone) of FIG. 7. It is detected by the sensing apparatuses 101 that the mobile phone is placed on the table at 14:03 (detection time), taken from the table at 17:08 (disappearance time) (see the column of storage location before previous storage location in FIG. 7), placed on the dining table at 17:10 (detection time), taken from the dining table at 17:20 (disappearance time) (see the column of previous storage location in FIG. 7), placed on the table at 17:22 (detection time), and then currently present on the table (see the column of current storage location in FIG. 7). Here, as with the article storage location database 107 of FIG. 6, an ID may be assigned to each storage location and the IDs of the storage locations may be stored in the article location history database 108 instead of the names of the storage locations.

In the equipment operation history database 105, information indicating each of storage equipments and access state estimation information indicating the states of access to the storage equipments by the user, together with times, are stored by the information processing means 110 as history information on access state information. Here, FIGS. 11A to 11D each show an example of the equipment operation history database 105. FIGS. 11A to 11D show equipment operation history databases 105 of each of the storage equipments (a bookshelf, a multipurpose cabinet, a cupboard, and a stationery case), respectively.

For example, in the example of the equipment operation history database 105 shown in FIG. 11A, operation history information on the bookshelf (e.g., the bookshelf 1203 in FIG. 12C) is shown. At 19:31, information on the state of detection of a person (which is an example of access state estimation information) is detected, indicating that it is detected that a user is putting his/her hand in the bookshelf. In this case, based on the access state estimation information, by the information processing means 110, the access state information indicates, as an example, accessing. At 19:32, information on the state of non-detection of a person (which is an example of access state estimation information) is detected, indicating that it is detected that the user has taken his/her hand out of the bookshelf. In this case, based on the access state estimation information, by the information processing means 110, the access state information indicates, as an example, not accessing.

In the example of the equipment operation history database 105 shown in FIG. 11B, operation history information on the multipurpose cabinet is shown. Door open information (which is an example of access state estimation information) indicating that a door is open at 19:10 is detected and it is detected that the door is open. In this case, based on the access state estimation information, by the information processing means 110, the access state information indicates, as an example, accessing. Door close information (which is an example of access state estimation information) indicating that the door is closed at 19:14 is detected and it is detected that the door is closed. In this case, based on the access state estimation information, by the information processing means 110, the access state information indicates, as an example, not accessing.

In the example of the equipment operation history database 105 shown in FIG. 11C, operation history information on the cupboard is shown. Door open information (which is an example of access state estimation information) indicating that a door is open at 18:14 is detected and it is detected that the door is open. In this case, based on the access state estimation information, by the information processing means 110, the access state information indicates, as an example, accessing. Door close information (which is an example of access state estimation information) indicating that the door is closed at 18:20 is detected and it is detected that the door is closed. In this case, based on the access state estimation information, by the information processing means 110, the access state information indicates, as an example, not accessing.

In the example of the equipment operation history database 105 shown in FIG. 11D, operation history information on the stationery case (e.g., the stationery case 1200 in FIG. 12A) is shown. Door open information (which is an example of access state estimation information) indicating that a door is open at 21:02 is detected and it is detected that the door is open. In this case, based on the access state estimation information, by the information processing means 110, the access state information indicates, as an example, accessing. Door close information (which is an example of access state estimation information) indicating that the door is closed at 21:04 is detected and it is detected that the door is closed. In this case, based on the access state estimation information, by the information processing means 110, the access state information indicates, as an example, not accessing.

The search state detection means 102 is connected to the article location history database 108, the equipment operation history database 105, and the search article estimation means 103. The search state detection means 102 grasps, by referring to the article location history database 108, whether any article is placed in the storage equipment or any article is taken out of the storage equipment during a period of time from when "open" is stored in the state of each storage equipment of the equipment operation history database 105 until "closed" is stored, or during a period of time from when "detection of person" is stored until "non-detection of person" is stored. If no article operation is performed on the storage equipment, then the search state detection means 102 determines that the user is searching for an article but has been unable to find the article.

Here, only when the search state detection means 102 has detected two times in a row the fact that no article operation is performed during a period of time from when the storage equipment is open until the storage equipment is closed, the search state detection means 102 may determine that the user is searching for an article but has been unable to find the article. Alternatively, only when the search state detection means 102 has detected three times in a row the above fact, the search state detection means 102 may determine that the user is searching for an article but has been unable to find the article.

By this, on each occasion, for example, in which a user has just checked on the contents of the storage equipment, this is considered such that the user is searching for some article; however, it becomes unnecessary for the search state detection means 102 to estimate the article that the user is searching for. In addition, when, for example, the user moves articles aside from the storage equipment and searches for another article but has been unable to find the article, a situation in which the article that the user is searching for is not estimated by the search state detection means 102 can be avoided.

The search article estimation means 103 is connected to the storage location database 107, the article location history database 108, the equipment operation history database 105, the environment database 201, the search state detection means 102, and the notification apparatus 104. After an article search state detection operation by the search state detection means 102, the search article estimation means 103 receives article search state detection result information from the search state detection means 102. First, the search article estimation means 103 obtains, by referring to the storage location database 107, the IDs of articles whose original storage locations are the storage equipment with respect to which it is determined by the search state detection means 102 that the user has failed an article search on the storage equipment. Then, the search article estimation means 103 narrows down, by referring to the article location history database 108, from the obtained article IDs to an article with an article ID that is not currently present at its original storage location, and then estimates the narrowed-down article to be the article that the user is searching for.

The notification apparatus 104 is connected to the search article estimation means 103 and the article location history database 108. The notification apparatus 104 notifies the user of a current location of an article estimated by the search article estimation means 103. The notification apparatus 104 can be implemented by using, for example, a lamp, speaker, a display that shows video and character information, or the like.

In the case in which a lamp is used for the notification apparatus 104, first, a lamp needs to be disposed at each storage location in the living environment. Then, when the notification apparatus 104 obtains, by referring to the article location history database 108, a current location of the article narrowed down by the search article estimation means 103, the notification apparatus 104 can notify the user by lighting up a lamp present at the current location of the article.

In the case also in which a speaker or a display is used for the notification apparatus 104, as with the case of using a lamp, the notification apparatus 104 grasps, by referring to the article location history database 108, the current location of the article narrowed down by the search article estimation means 103, and then can notify the user of the current location of the article by sound in the case of the speaker or by video in the case of the display.

Figure 18:
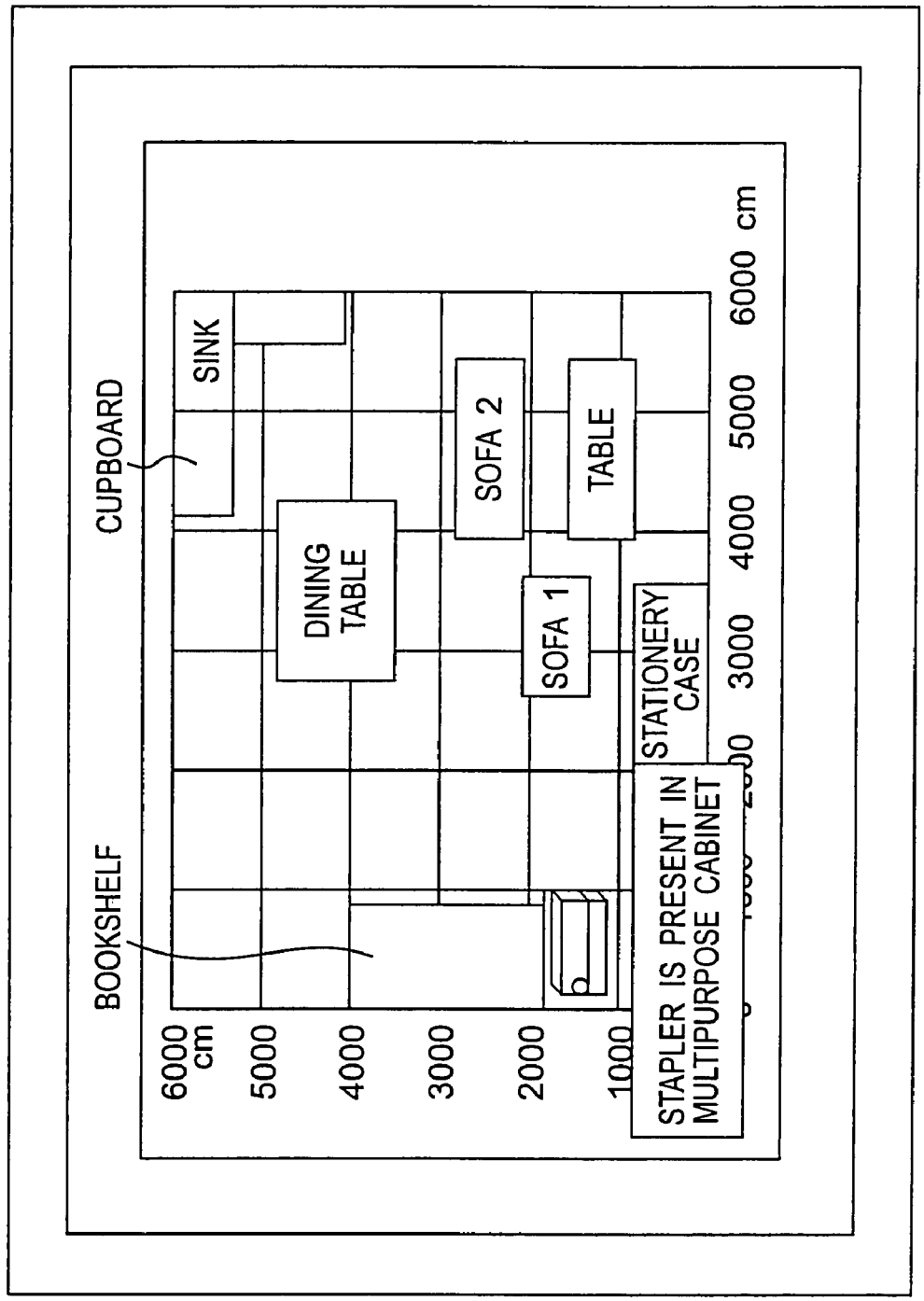
FIG. 18 is a view showing a display example to be provided when a display is used for a notification apparatus of the search article estimation apparatus according to the first embodiment of the present invention.

Here, it is easier for the user to understand and more effective if not only the current location of the article but also the name of the article can be notified. Furthermore, it is more effective that for a notification apparatus 104 present at a location, such as a kitchen, where the user does not want to take his/her eyes off during cooking, a speaker is used so that the user is notified by sound from the speaker; and for a notification apparatus 104 present at a location where due to television sound it is hard to hear other sounds, a display is used so that the user is notified by an image on the display. FIG. 18 shows a notification example of an article location by means of a display. FIG. 18 shows an example in which the fact that a stapler is present in a multipurpose cabinet is notified by both image data and text data.

Next, a search article estimation process of the search article estimation apparatus will be described with reference to flowcharts shown in FIGS. 13A to 14.

Figure 13B:
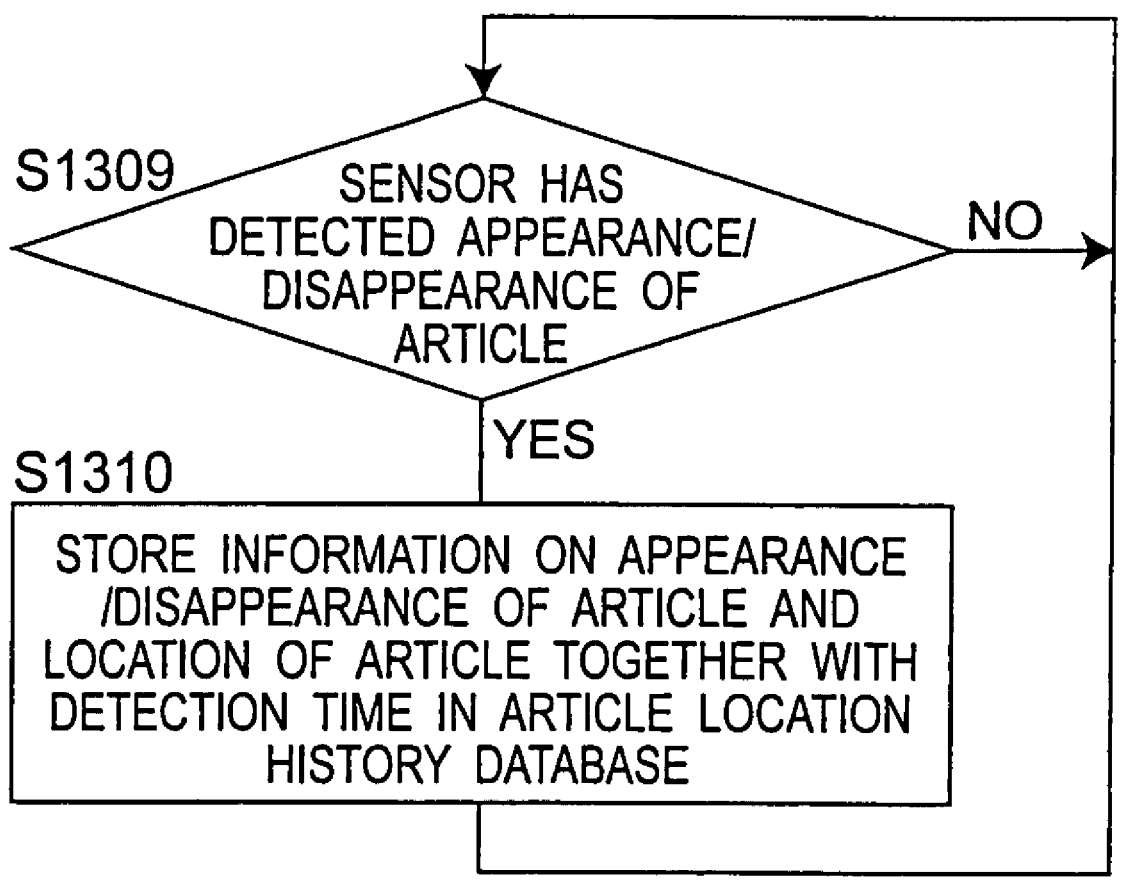
FIG. 13B is a flowchart showing an article appearance/disappearance detection operation in the search article estimation process of the search article estimation apparatus according to the first embodiment of the present invention.
Figure 14:
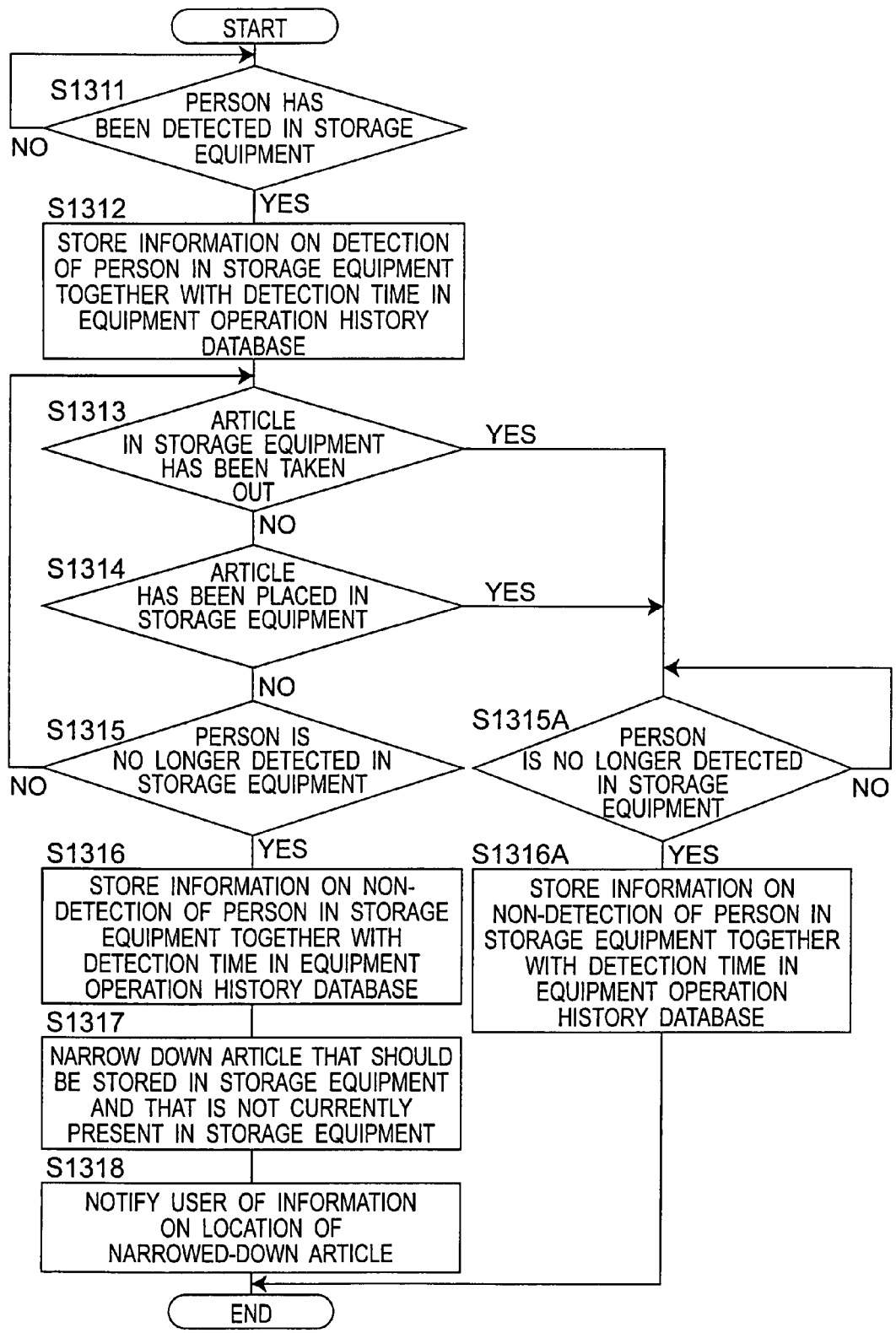
FIG. 14 is a flowchart showing a search article estimation process to be applied to a storage equipment that does not have an open/close function in the search article estimation apparatus according to the first embodiment of the present invention.

First, the search article estimation process of the flowcharts shown in FIGS. 13A, 13B, and 14 is applied to one of the storage equipments present in the living environment. While the search article estimation apparatus is in operation, the search article estimation processes shown in the flowcharts with the same number as the number of the storage equipments present in the living environment are applied and the processes are simultaneously processed with each other. Here, FIG. 13A is the flowchart of a search article estimation process to be applied to a storage equipment that has an open/close function and FIG. 14 is the flowchart of a search article estimation process to be applied to a storage equipment that does not have an open/close function. The flowchart shown in FIG. 13B shows that the sensing apparatus 101 always senses appearance/disappearance of an article, and upon detection of appearance/disappearance of the article (step S1309), information on the appearance/disappearance is stored, through the information processing means 110, in the equipment operation history database 105 and the article location history database 108 (step S1310).

Here, as shown in FIG. 13A, the search article estimation process will be described using a multipurpose cabinet as an example of a storage equipment having an open/close function.

First, the information processing means 110 stays in standby until the user opens a door of the multipurpose cabinet, specifically, until a sensing apparatus 101 that senses the multipurpose cabinet, such as contact sensors, detects opening of the multipurpose cabinet (step S1301). If the user opens the door of the multipurpose cabinet, then the sensing apparatus 101 that senses opening/closing of the multipurpose cabinet detects the opening of the multipurpose cabinet and information on the opening of the multipurpose cabinet together with a detection time are stored in the equipment operation history database 105 by the information processing means 110 (step S1302).

Then, whether the user takes some article out of the multipurpose cabinet is detected by a sensing apparatus 101 such as a tag reader (step S1303). It is assumed that it is detected by the sensing apparatus 101 that the user does not take any article out of the multipurpose cabinet and stores some article in the multipurpose cabinet (NO at step S1303 and YES at step S1304). By the sensing apparatus 101 detecting the stored article, information indicating that the article is stored in the multipurpose cabinet is stored in the article location history database 108 by the information processing means 110. The search state detection means 102 refers to the information stored in the article location history database 108 by the information processing means 110 (i.e., information stored in the article location history database 108 by the information processing means 110 and indicating that the article is stored in the multipurpose cabinet), and thereby determines that the user is not searching for any article.

Subsequently, whether the door of the multipurpose cabinet is closed by the user is detected (step S1305A). If it is detected by the sensing apparatus 101 that the door of the multipurpose cabinet is closed by the user (Yes at step S1305A), then information on the closing of the multipurpose cabinet together with a detection time are stored in the equipment operation history database 105 by the information processing means 110 (step S1306A) and the process of the flowchart ends. Note that when, at step S1305A, the door of the multipurpose cabinet is not closed by the user even after the lapse of a predetermined period of time, too, the process of the flowchart may end.

When the sensing apparatus 101 that senses within the multipurpose cabinet detects storing of the article (step S1309), information indicating that the article is stored in the multipurpose cabinet is stored in the article location history database 108 by the information processing means 110 (i.e., ID information on the article detected by the sensing apparatus 101, ID information on the multipurpose cabinet, and time information from the timer 109 are stored by the information processing means 110 so as to be associated with one another) (step S1310).

When the user takes some article out of the multipurpose cabinet (YES at step S1303), too, by the sensing apparatus 101 detecting that the article is taken out, information indicating that the article is taken out of the multipurpose cabinet is stored in the article location history database 108. Then, the search state detection means 102 refers to the information stored in the article location history database (i.e., information stored in the article location history database 108 and indicating that the article is taken out of the multipurpose cabinet), and thereby determines that the user is not searching for any article (because the user has found a search article) and the process proceeds to step S1305A.

On the other hand, when the user does not take any article out of the multipurpose cabinet (NO at step S1303) and does not store any article in the multipurpose cabinet (NO at step S1304) and the door of the multipurpose cabinet is closed, the sensing apparatus 101 detects that the door of the multipurpose cabinet is closed (YES at step S1305) and information on the closing of the multipurpose cabinet together with a detection time are stored in the equipment operation history database 105 by the information processing means 110 (step S1306). Then, the search state detection means 102 obtains, by referring to the article location history database 108, information indicating that no articles are stored in the multipurpose cabinet and no articles are taken out of the multipurpose cabinet during a period of time from the opening to the closing of the multipurpose cabinet stored in the equipment operation history database 105, and determines that the user has performed an article search but still cannot find an article.

Then, in response to such a determination result by the search state detection means 102, the search article estimation means 103 estimates an article that should originally be stored in the multipurpose cabinet and that is not currently present in the multipurpose cabinet to be the article that the user is searching for (step S1307). Specifically, as described above, first, the search article estimation means 103 obtains, by referring to the storage location database 107, article IDs whose original storage locations are the multipurpose cabinet with respect to which it is determined by the search state detection means 102 that the user has failed an article search on the multipurpose cabinet. Then, the search article estimation means 103 narrows down, by referring to the article location history database 108, from the obtained article IDs to an article with an article ID that is not currently present in the multipurpose cabinet which is the original storage location, and then estimates the narrowed-down article to be the article that the user is searching for.

The above-described process will be more specifically described using the examples of FIGS. 6, 7, and 11B. By the search state detection means 102 referring to the equipment operation history database 105 of the multipurpose cabinet in FIG. 11B, it is determined by the search state detection means 102 that the door of the multipurpose cabinet is open at 19:10 and closed at 19:14. Here, by the search state detection means 102 referring to the article location history database 108 in FIG. 7, it is found that there are no article IDs that are stored during such a period of time in the multipurpose cabinet as a storage location. Thus, it is determined by the search state detection means 102 that no articles are stored in the multipurpose cabinet and no articles are taken out of the multipurpose cabinet during the period of time. In this manner, the search state detection means 102 determines that the user has performed an article search but still cannot find an article. Subsequently, when the search article estimation means 103 receives a result of the determination by the search state detection means 102, by the search article estimation means 103 referring to the storage location database 107 in FIG. 6, it is determined by the search article estimation means 103 that articles designating the multipurpose cabinet as their storage locations are articles with article IDs of ID001 and ID002. Furthermore, by the search article estimation means 103 referring to the article location history database 108 in FIG. 7, it is determined by the search article estimation means 103 that an article, among the articles, that is not currently present in the multipurpose cabinet is a mobile phone with an article ID of ID001. In this manner, the search article estimation means 103 estimates the mobile phone with ID001 to be the article that the user is searching for.

Finally, a current location of the article (e.g., the mobile phone in the above-described example) narrowed down by the search article estimation means 103 is notified to the user by the notification apparatus 104 such as a lamp, speaker, a display, or the like (step S1308), and then the process ends. Note that the current location of the narrowed-down article can be obtained by the notification apparatus 104 referring to the article location history database 108.

When the user does not take any article out of the multipurpose cabinet (NO at step S1303) and does not store any article in the multipurpose cabinet (NO at step S1304) and the door of the multipurpose cabinet is not closed and the sensing apparatus 101 cannot detect, within a predetermined period of time, that the door of the multipurpose cabinet is closed (NO at step S1305), the process returns to step S1303.

Next, as shown in FIG. 14, the search article estimation process will be described using a bookshelf as an example of storage equipment that does not have an open/close function.

First, the information processing means 110 stays in standby until the user puts his/her hand in the bookshelf, specifically, until a sensing apparatus 101 that senses an entry of the bookshelf, such as a pyroelectric infrared sensor, detects the hand put in the bookshelf (detection of a person) (step S1311). When the user puts his/her hand in the bookshelf, the sensing apparatus 101 that senses the entry of the bookshelf detects the hand put in the bookshelf (YES at step S1311) and information on detection of a person for the bookshelf together with a detection time are stored in the equipment operation history database 105 by the information processing means 110 (step S1312).

Then, whether the user takes any article out of the bookshelf is detected by a sensing apparatus 101 such as a tag sensor (step S1313). It is assumed that the user does not take any article out of the bookshelf (NO at step. S1313) and stores some article in the bookshelf (YES at step S1314). Then, by the sensing apparatus 101 detecting the stored article, information indicating that the article is stored in the bookshelf is stored in the article location history database 108 by the information processing means 110. The search state detection means 102 refers to the information stored in the article location history database 108 (i.e., information stored in the article location history database 108 by the information processing means 110 and indicating that the article is stored in the bookshelf), and thereby determines that the user is not searching for any article.

Subsequently, whether the user's hand is taken out of the bookshelf is detected (step S1315A). If the sensing apparatus 101 detects that the user's hand is taken out of the bookshelf (a person is no longer detected) (YES at step S1315A), then information on non-detection of a person for the bookshelf together with a detection time are stored in the equipment operation history database 105 by the information processing means 110 (step S1316A), and then the process of the flowchart ends.

When the sensing apparatus 101 that senses within the bookshelf detects that the article is taken out (step S1309), information indicating that the article is taken out of the bookshelf is stored in the article location history database 108 by the information processing means 110 (i.e., ID information on the article detected by the sensing apparatus 101, ID information on the bookshelf, and time information from the timer 109 are stored by the information. processing means 110 so as to be associated with one another) (step S1310).

Note that when the user takes some article out of the bookshelf (YES at step S1313), too, by the sensing apparatus 101 detecting that the article is taken out, information indicating that the article is taken out of the bookshelf is stored in the article location history database 108. Then, the search state detection means 102 refers to the information stored in the article location history database 108 (i.e., information stored in the article location history database 108 and indicating that the article is taken out of the bookshelf), and thereby determines that the user is not searching for any article (because the user has found a search article) and the process proceeds to step S1315A.

On the other hand, when the user does not take any article out of the bookshelf (NO at step S1313) and does not store any article in the bookshelf (NO at step S1314) and takes his/her hand out of the bookshelf, the sensing apparatus 101 detects that the user takes his/her hand out of the bookshelf (a person is no longer detected) (YES at step S1315) and information on non-detection of a person for the bookshelf together with a detection time are stored in the equipment operation history database 105 by the information processing means 110 (step S1316). Then, the search state detection means 102 obtains, by referring to the article location history database 108, information indicating that no articles are stored in the bookshelf and no articles are taken out of the bookshelf during a period of time from the detection of a person to the non-detection of a person at the bookshelf stored in the equipment operation history database 105, and determines that the user has performed an article search but still cannot find an article.

Then, in response to such a determination result by the search state detection means 102, the search article estimation means 103 estimates an article that should originally be stored in the bookshelf and that is not currently present in the bookshelf to be the article that the user is searching for (step S1317). Specifically, as described above, first, the search article estimation means 103 obtains, by referring to the storage location database 107, article IDs whose original storage locations are the bookshelf with respect to which it is determined by the search state detection means 102 that the user has failed an article search on the bookshelf. Then, the search article estimation means 103 narrows down, by referring to the article location history database 108, from the obtained article IDs to an article with an article ID that is not currently present in the bookshelf which is the original storage location, and then estimates the narrowed-down article to be the article that the user is searching for.

The above-described process will be more specifically described using the examples of FIGS. 6, 7, and 11A. By the search state detection means 102 referring to the equipment operation history database 105 of the bookshelf in FIG. 11A, it is. determined by the search state detection means 102 that detection of a person is made at 19:31 and non-detection of a person is made at 19:32 on the bookshelf. Here, by the search state detection means 102 referring to the article location history database 108 in FIG. 7, it is found that there are no article IDs that are stored during such a period of time in the bookshelf as a storage location. Thus, it is determined by the search state detection means 102 that no articles are stored in the bookshelf and no articles are taken out of the bookshelf during the period of time. In this manner, the search state detection means 102 determines that the user has performed an article search but still cannot find an article. Subsequently, when the search article estimation means 103 receives a result of the determination by the search state detection means 102, by the search article estimation means 103 referring to the storage location database 107 in FIG. 6, it is determined by the search article estimation means 103 that articles designating the bookshelf as their storage locations are articles with article IDs of ID005 and ID006. Furthermore, by the search article estimation means 103 referring to the article location history database 108 in FIG. 7, it is determined by the search article estimation means 103 that an article, among the articles, that is not currently present in the bookshelf is a magazine with an article ID of ID006. In this manner, the search article estimation means 103 estimates the magazine with ID006 to be the article that the user is searching for.

Finally, a current location of the article (e.g., the magazine with ID006 in the above-described example) narrowed down by the search article estimation means 103 is notified to the user by the notification apparatus 104 such as a lamp, speaker, a display, or the like (step S1318), and then the process ends. Note that the current position of the narrowed-down article can be obtained by the notification apparatus 104 referring to the article location history database 108.

When the user does not take any article out of the bookshelf (NO at step S1313) and does not store any article in the bookshelf (NO at step S1314) and detection of a person is continuously made on the bookshelf (NO at step S1315), the process returns to step S1313.

Here, the case may be considered in which the user cannot see well inside the storage equipment and thus takes front articles out of the storage equipment once and then searches for an article inside the storage equipment. FIG. 21 shows a flowchart that copes with such an issue. Note that although here there is shown a flowchart for storage equipment having an open/close function, an equivalent process is performed for a storage equipment that does not have an open/close function (i.e., opening of the door should be read as detection of a person and closing of the door should be read as non-detection of a person), and thus, the description thereof will be omitted here.

According to the flowchart, the fact that the door of the storage equipment is open is detected by a sensing apparatus 101 such as contact sensors (YES at step S2801). Even if putting in and taking out articles are performed several times during a period of time from when information on the opening of the door is stored (step S2802) until when the fact that the door is closed is detected by the sensing apparatus 101 such as contact sensors (until the determination at step S2803 becomes YES), when there is no change in articles present in the storage equipment when the door is open from articles present in the storage equipment when the door is closed (NO at steps S2804 and S2805), it is determined by the search article estimation means 103 that such putting in and taking out articles are just performed for an article search and it is determined thereby that an article that the user is searching for is not present in the storage equipment. Thus, the search article estimation means 103 estimates an article that should be stored in the storage equipment and that is not currently present in the storage equipment to be the article that the user is searching for (step S2806). After this, if necessary, the same notification operation as that of step S1308 may be performed.

At step S2802, information on the opening of the storage equipment together with a detection time are stored in the equipment operation history database 105 by the information processing means 110. At step S2804, information on the closing of the storage equipment together with a detection time are stored in the equipment operation history database 105 by the information processing means 110. When, at step S2805, there is a change in articles present in the storage equipment when the door is open from articles present in the storage equipment when the door is closed (YES at step S2805), it can be determined that the user has searched for an article in the storage equipment and has found the article and thus the article search has ended, or that the user has just stored an article in the storage equipment and has not performed an article search. Therefore, the process ends here.

According to the first embodiment, the fact that, as a result of a search by a user for an article being searched for in a storage equipment where the article is likely to be present, the article has been unable to be found is automatically determined by the search state detection means 102 and an article that should originally be present in the storage equipment and that is not currently present in the storage equipment is determined by the search article estimation means 103 to be the article that the user is searching for. Thus, there is no need for the user to purposefully input information on an article that the user wants to search for, to the search article estimation apparatus. In addition, by allowing the notification apparatus 104 to notify the user of information on a location of the article that the user wants to search for, which is a result of the estimation made by the search article estimation means 103, the user can more efficiently search for the article.

Second Embodiment

Figure 22:
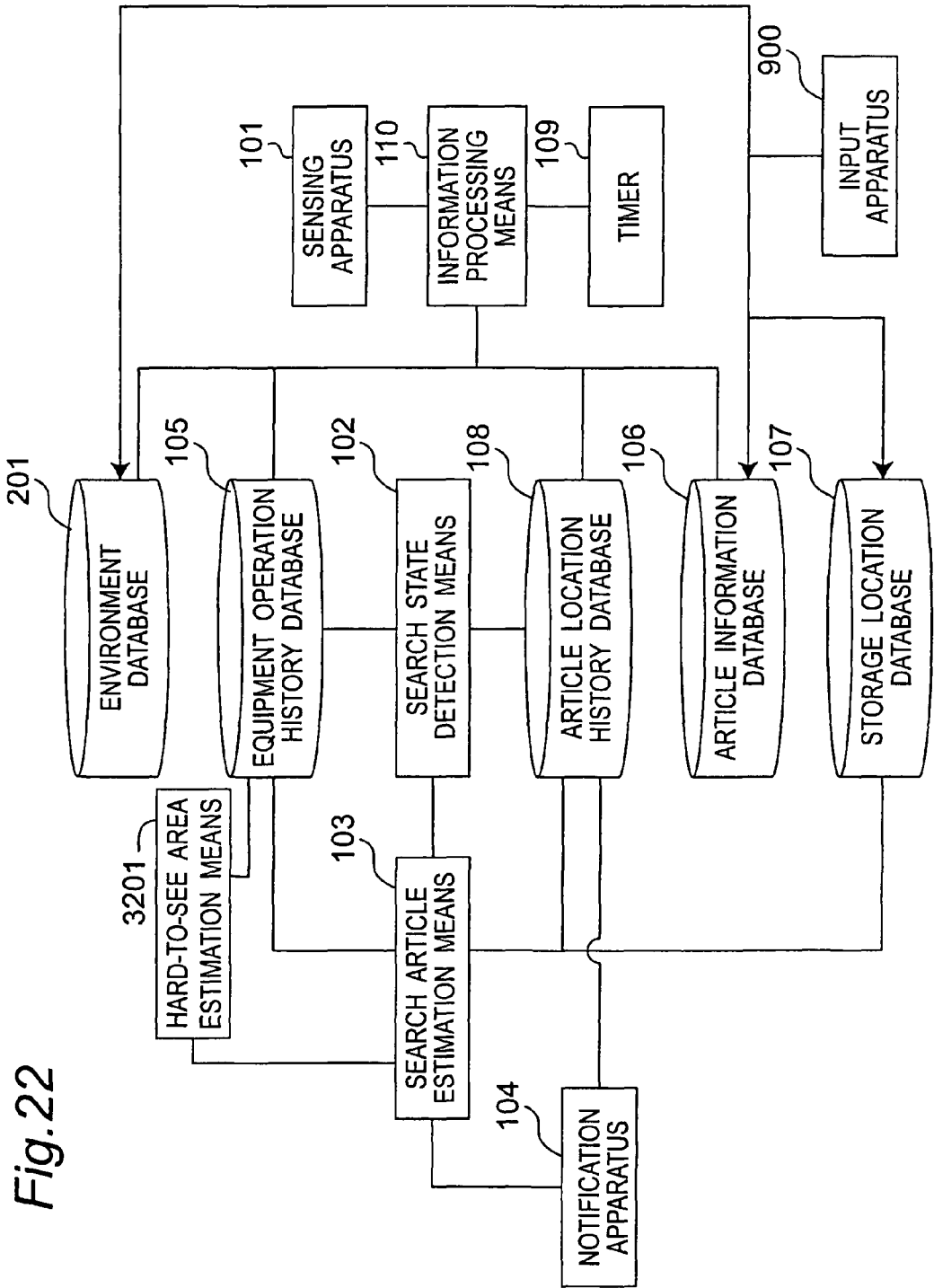
FIG. 22 is a block diagram showing a search article estimation apparatus according to a second embodiment of the present invention.

FIG. 22 is a block diagram showing a search article estimation apparatus according to a second embodiment of the present invention.

The search article estimation apparatus is composed of an article information database 106, a storage location database 107, a timer 109, a sensing apparatus 101, an information processing means 110, an article location history database 108, an equipment operation history database 105, an environment database 201, a search state detection means 102, a search article estimation means 103, a notification apparatus 104, and a hard-to-see area estimation means 3201. An input apparatus 900 such as a keyboard, a mouse, or a microphone may further be provided to allow a user to manually set a database or the like.

The means, apparatuses, databases, and timer 109 except for the hard-to-see area estimation means 3201 have equivalent configuration and functionality to those described in the first embodiment and thus the description thereof will be omitted and the configuration and operation of the hard-to-see area estimation means 3201 will be mainly described.

The hard-to-see area estimation means 3201 is connected to the equipment operation history database 105 and the search article estimation means 103. The hard-to-see area estimation means 3201 refers to the degree of the opening and closing of a storage equipment during a period of time from when "open" is stored, by the information processing means 110, in the state of the storage equipment in the equipment operation history database 105 until "closed" is stored, and estimates an area of the storage equipment that is hard for the user to see. The hard-to-see area estimation means 3201 will be described below using FIGS. 23A to 23D.

Figure 23A:
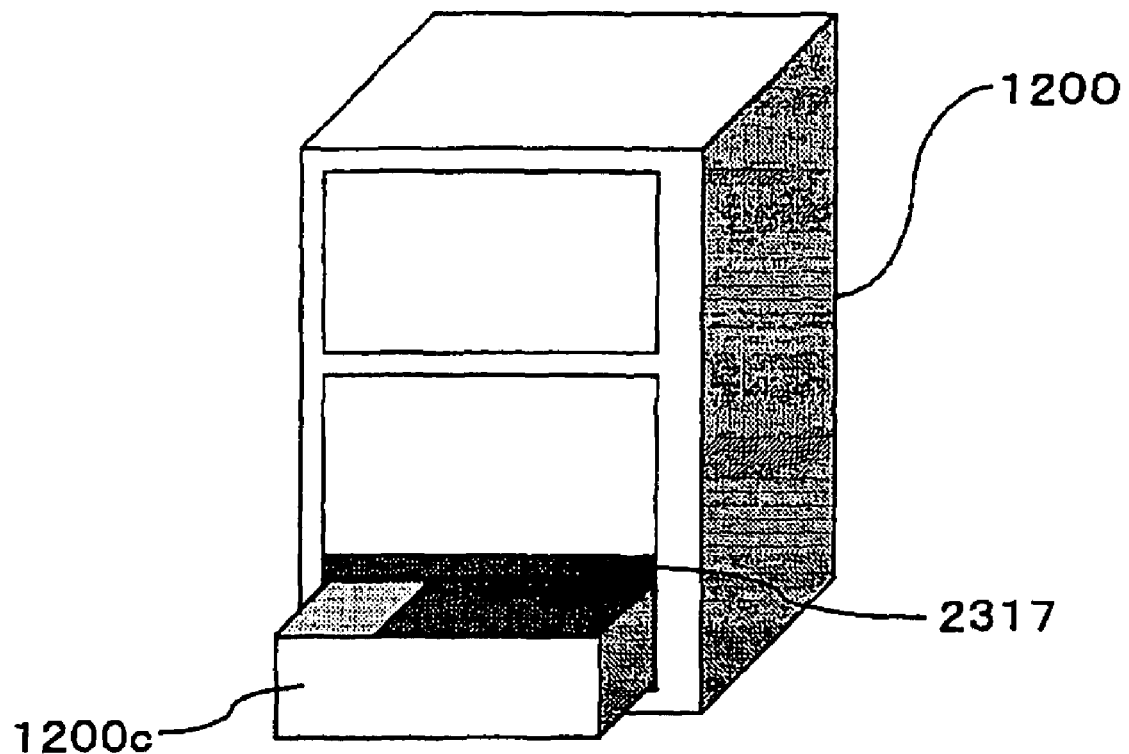
FIG. 23A is a perspective view of a stationery case for describing the search article estimation apparatus according to the second embodiment of the present invention.
Figure 23B:
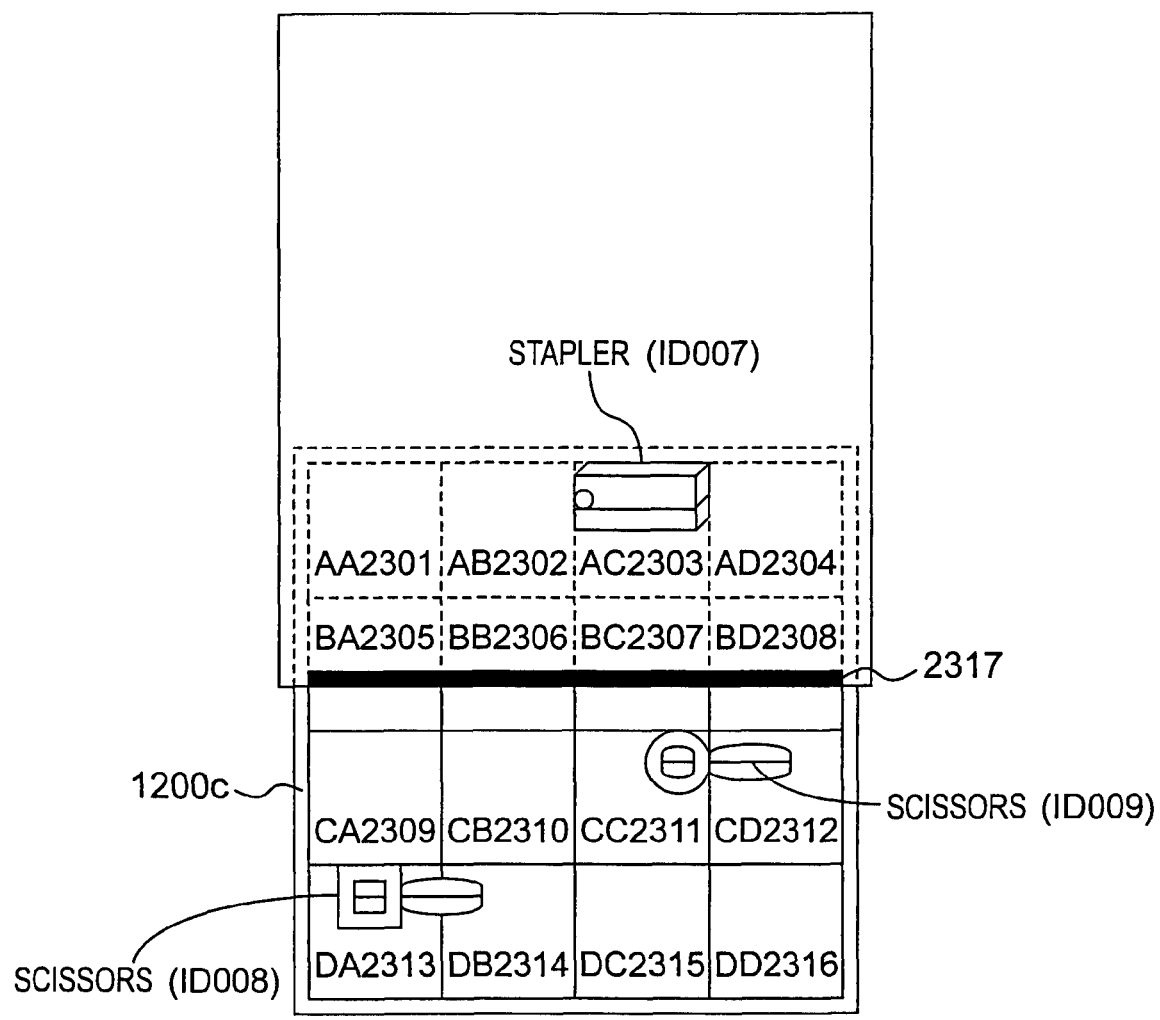
FIG. 23B is a plan view of the stationery case for describing the search article estimation apparatus according to the second embodiment of the present invention.

FIG. 23A shows a stationery case 1200 and FIG. 23B is a plan view of the stationery case 1200. Tag readers AA 2301 to DD 2316 which are an example of the sensing apparatus 101 are spread over a drawer 1200c of the stationery case 1200 (see FIG. 23D). The tag readers AA 2301 to DD 2316 each can detect a tag attached to an article and can detect a tag 2317 attached to a main body portion of the stationery case at the upper side of an entry of the drawer 1200c of the stationery case 1200. Note, however, that since the tag 2317 is attached to the main body portion of the stationery case at the upper side of the entry of the drawer 1200c, when the drawer 1200c is closed, the tag readers AA 2301 to DD 2316 cannot detect the tag 2317 and depending on how far the drawer 1200c is pulled out, which of the tag readers AA 2301 to DD 2316 can detect the tag 2317 varies. Here, FIG. 23A shows a state in which a user has pulled the drawer 1200c halfway out to search an article in the stationery case 1200. In the pull-out state of the drawer 1200c of the stationery case 1200 shown in FIGS. 23A and 23B, the tag reader BA 2305, the tag reader BB 2306, the tag reader BC 2307, and the tag reader BD 2308 can detect the tag 2317. FIG. 23C shows a state in which the information processing means 110 stores, in response to detection results obtained by the tag reader BA 2305, the tag reader BB 2306, the tag reader BC 2307, and the tag reader BD 2308 in the pull-out state of the drawer 1200c in FIG. 23B, information in the equipment operation history database 105, and shows that the tag reader BA 2305, the tag reader BB 2306, the tag reader BC 2307, and the tag reader BD 2308 detect the tag 2317 at 23:45.

When the hard-to-see area estimation means 3201 refers to the detection state of the tag 2317 stored in the equipment operation history database 105 by the information processing means 110 and grasps that the tag reader BA 2305, the tag reader BB 2306, the tag reader BC 2307, and the tag reader BD 2308 detect the tag 2317, the hard-to-see area estimation means 3201 estimates tag readers including the tag reader BA 2305, the tag reader BB 2306, the tag reader BC 2307, and the tag reader BD 2308 and those (the tag reader AA 2301, the tag reader AB 2302, the tag reader AC 2303, and the tag reader AD 2304) installed on the further back of the drawer 1200c than the tag reader BA 2305, the tag reader BB 2306, the tag reader BC 2307, and the tag reader BD 2308, to be an area that is hard for the user to see.

Thereafter, it is assumed, for example, that the fact that the user does not take out any article from the stationery case 1200 and closes the drawer 1200c without storing any article is detected by the sensing apparatus 101 at 23:48. Then, the search state detection means 102 determines that the user has searched through the stationery case 1200 but has been unable to find an article that the user wants to search for. In response to a result of the determination made by the search state detection means 102, the search article estimation means 103 can estimate an article that should originally be stored in the stationery case 1200 and that is not currently present in the stationery case 1200 or an article , e.g., a stapler (ID007), stored in the area in the stationery case 1200 that is estimated by the hard-to-see area estimation means 3201 to be hard for the user to see, to be the article that the user is searching for.

According to the second embodiment, an area of storage equipment that a user cannot see or that is hard for the user to see is estimated by how far a door or drawer of the storage equipment is open and taking into account the possibility that the user may overlook articles in that area, an article that the user is searching for can be estimated by the hard-to-see area estimation means 3201. Thus, the article that the user is searching for can be more accurately estimated.

Third Embodiment

Figure 3:
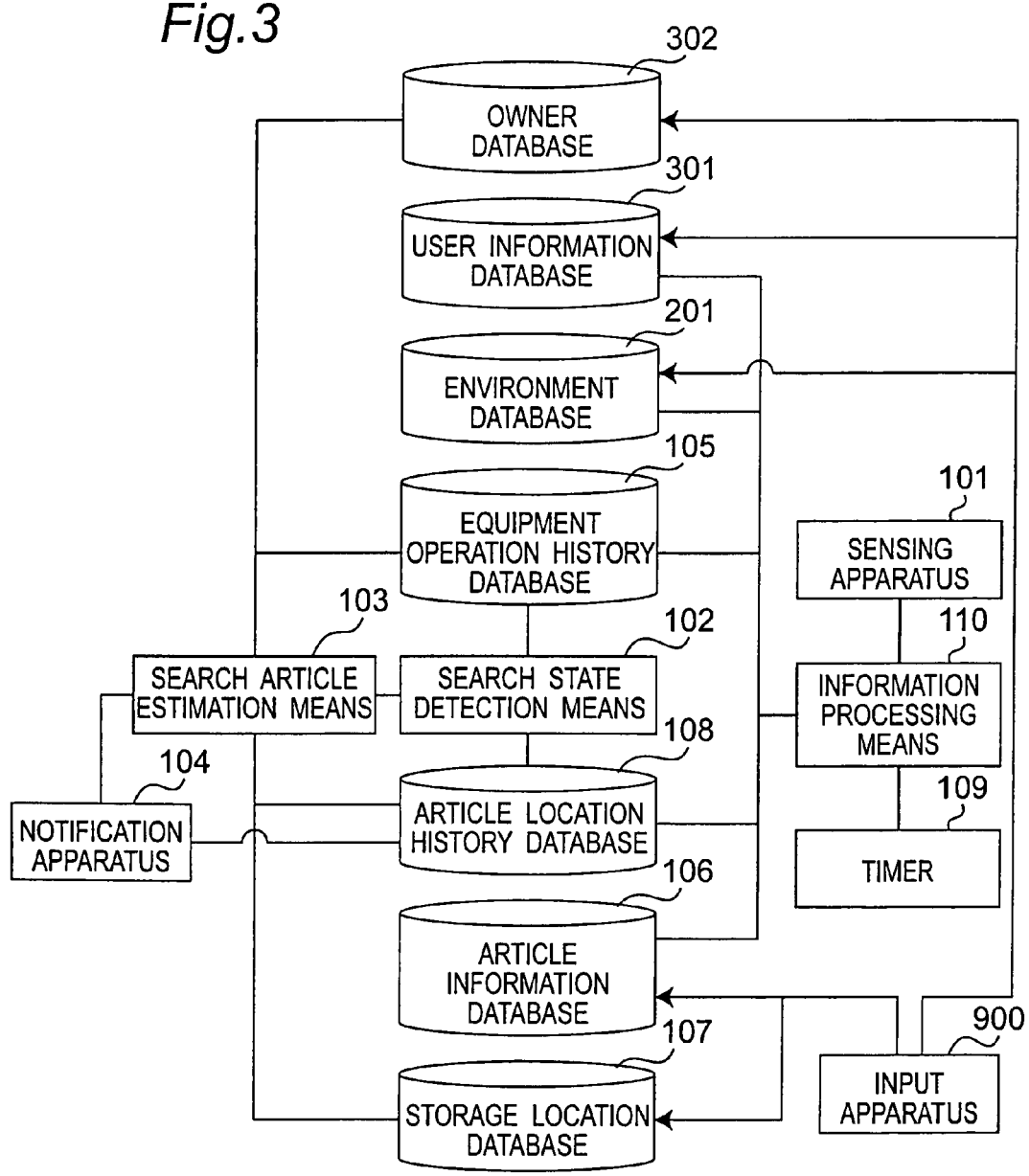
FIG. 3 is a block diagram showing a configuration of a search article estimation apparatus according to a third embodiment of the present invention.

FIG. 3 is a block diagram showing a search article estimation apparatus according to a third embodiment of the present invention.

The search article estimation apparatus is composed of an article information database 106, a storage location database 107, a timer 109, a sensing apparatus 101, an information processing means 110, an article location history database 108, an equipment operation history database 105, a search state detection means 102, a search article estimation means 103, a notification apparatus 104, an environment database 201, a user information database 301, and an owner database 302.

The means, apparatuses, databases, and timer 109 except for the user information database 301 and the owner database 302 have equivalent configuration and functionality to those described in the first embodiment and thus the description thereof will be omitted and the , configuration and operation of the user information database 301 and the owner database 302 will be mainly described.

The user information database 301 stores therein information on IDs of users and user information necessary to estimate the IDs of users. Here, FIG. 10A shows an example of the user information database 301. In FIG. 10A, as an example of user information for estimating the ID of a user, a user name, a user body height, and a user body weight are stored. By using the user information database 301, it becomes possible to determine, by the search state detection means 102, who is currently performing an article search.

The owner database 302 stores therein information on owners of respective articles stored in the article information database 106. Here, FIG. 9 shows an example of the owner database 302. Although, in FIG. 9, up to the third owners are stored for respective articles with article ID001 to ID009, it is not always necessary to store up to the third owners. By using the owner database 302, it becomes possible for the search article estimation means 103 to estimate, from belongings of a user who is currently searching for an article, a candidate for the article that the user is currently searching for.

Here, an input apparatus 900 such as a keyboard, a mouse, or a microphone may further be provided to allow a user to manually set the user information database 301, the owner database 302, or the like.

Next, a search article estimation process of the search article estimation apparatus will be described with reference to a flowchart shown in FIG. 17 and using an example in which an older sister (user ID: U003) searches for a cup. Here, portions of the search article estimation process other than an article narrow-down portion are equivalent to those at steps S1301 to S1305, S1305A, S1306A, and S1308 and steps S1311 to S1315, S1315A, S1316A, and S1318 of the search article estimation process of the flowchart (the first embodiment) of FIGS. 13A and 14, and thus, the detailed description of those portions will be omitted.

First, when the older sister who is the user opens a door of a cupboard to search for the cup, the opening of the door of the cupboard is detected by a sensing apparatus 101 such as contact sensors (step S1301 of FIG. 13A and step S1311 of FIG. 14). However, cups (ID003 and ID004) are not currently present in the cupboard (see FIG. 7: the cup ID003 is currently on a table and the cup ID004 is currently on a dining table) and thus the older sister closes the door of the cupboard without being able to find a cup, at which time the closing of the door of the cupboard is detected by the sensing apparatus 101 such as contact sensors (steps S1304 to S1305 in FIG. 13A and steps S1314 to S1315 in FIG. 14).

Figure 17:
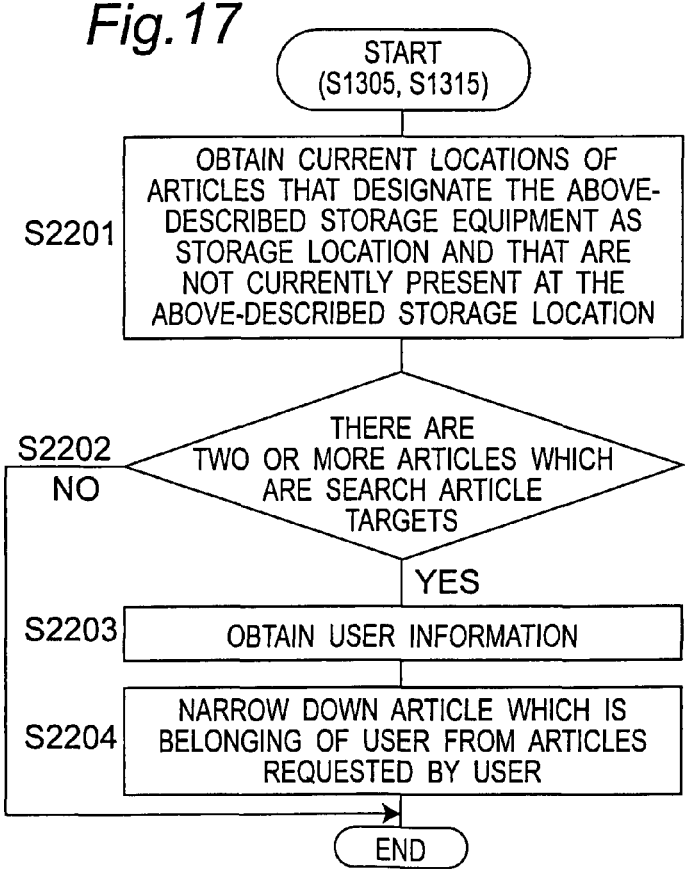
FIG. 17 is a flowchart showing a search article estimation process of the search article estimation apparatus according to the third embodiment of the present invention.

Then, the search article estimation means 103 first narrows down articles that designate the cupboard as their original storage locations and that are not currently present in the cupboard, based on the storage location database 107 (see FIG. 6) and the article location history database 108 (see FIG. 7) (step S2201 in FIG. 17).

As a result, two articles, i.e., a cup (ID003) and a cup (ID004), are found by the search article estimation means 103 (step S2202). Then, the search article estimation means 103 refers to the user information database 301 based on a result of sensing the user by a sensing apparatus 101 such as a camera or a tag reader, and thereby grasps that the current user is the older sister (U003) (step S2203). Here, a method of recognizing the older sister as the user is already described using the sensing apparatus 101, such as the camera or the tag reader, in the first embodiment and thus the description thereof will be omitted.

Subsequently, the search article estimation means 103 refers to the owner database 302 to check whether the cup (ID003) and the cup (ID004) are cups owned by the older sister. Then, it is determined by the search article estimation means 103 that the cup (ID003) is a cup owned by the older sister with a user ID of U003 as the first owner (see FIG. 9) and it is estimated by the search article estimation means 103 that the cup (ID003) is the first candidate for the article that the older sister is searching for (step S2204). Here, the cup (ID004) is a cup owned by a father with a user ID of U001 as the first owner, a mother with a user ID of U002 as the second owner, and a younger brother with a user ID of U0043 as the third owner but not by the older sister, and thus is ignored.

Finally, a current location (the table in FIG. 7) of the cup (ID003) narrowed down by the search article estimation means 103 is obtained by the notification apparatus 104 referring to the article location history database 108, and the current location of the cup (ID003) is notified to the older sister by the notification apparatus 104 such as a lamp, a speaker, or a display (step S1308 in FIG. 13A and step S1318 in FIG. 14) and then the process ends.

Here, as shown in FIG. 10B, an average find time for an article search may further be stored for each user in the user information database 301. For example, when one who is searching for an article is father, it can be determined by the search state detection means 102 that he can normally find an article within 20 seconds. if, however, a state continues in which father is searching through the same single storage equipment over 20 seconds (e.g., a state in which the door of the cupboard has been open over 20 seconds), then the search state detection means 102 determines that the article that the father is searching for is not present in the storage equipment and thus without waiting for the door to be closed (without waiting for detection of closing of the door by the sensing apparatus 101), the search article estimation means 103 can start estimation of the article that the father is searching for.

According to the third embodiment, by the search article estimation means 103 referring to the user information database 301 and the owner database 302, a current user can be identified and an article that the user is searching for can be narrowed down from belongings of the user, whereby more accurate article estimation can be made by the search article estimation means 103.

Fourth Embodiment

Figure 25:
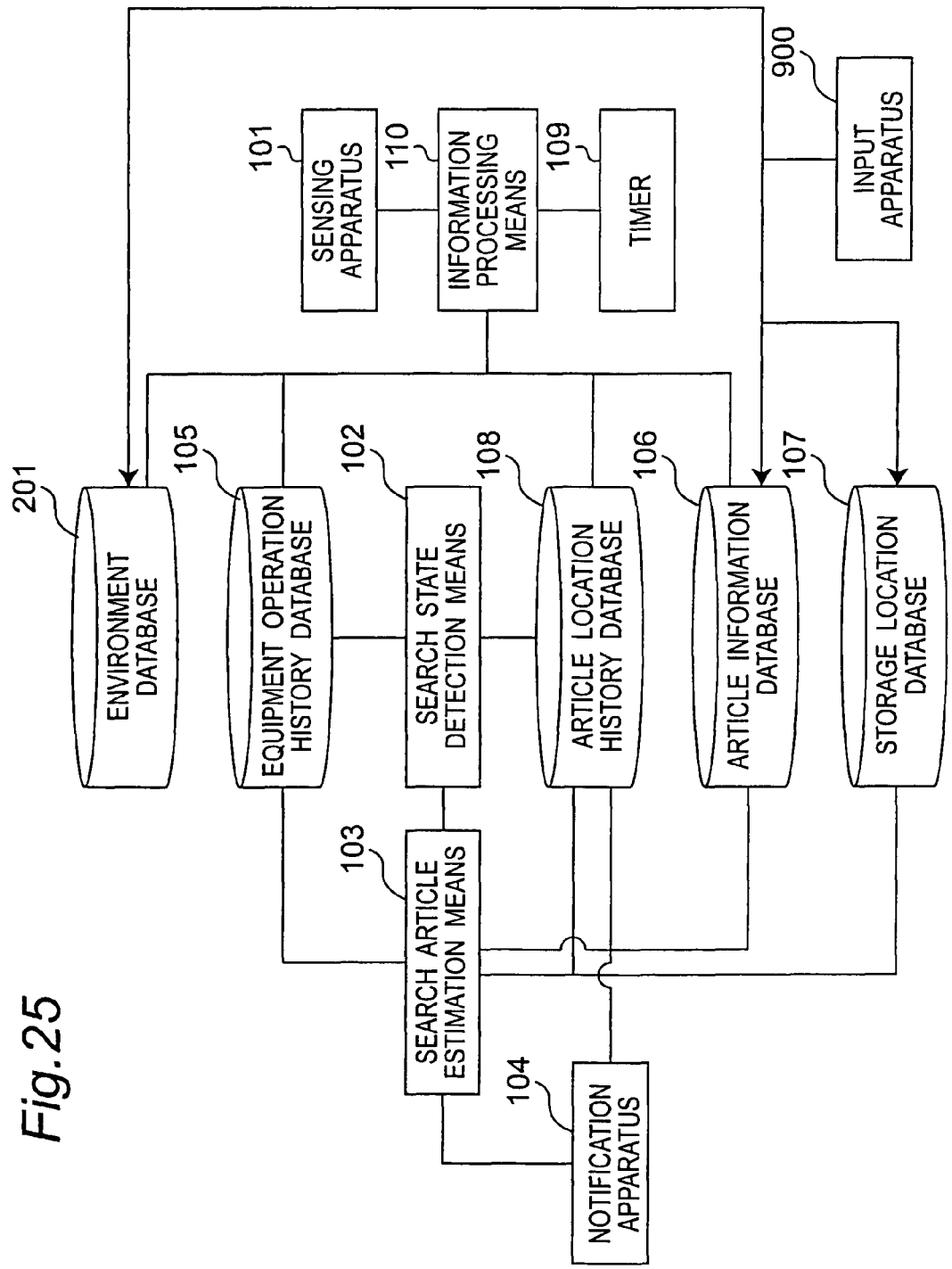
FIG. 25 is a block diagram showing a configuration example of the search article estimation apparatus according to the fourth embodiment of the present invention.

FIG. 25 is a block diagram showing a search article estimation apparatus according to a fourth embodiment of the present invention.

The search article estimation apparatus is composed of an article information database 106, a storage location database 107, a timer 109, a sensing apparatus 101, an information processing means 110, an article location history database 108, an equipment operation history database 105, an environment database 201, a search state detection means 102, a search article estimation means 103, and a notification apparatus 104.

The means, apparatuses, databases, and timer 109 except for the article information database 106 have equivalent configuration and functionality to those described in the first to third embodiments and thus the description thereof will be omitted and the configuration and operation of the article information database 106 will be mainly described.

The article information database 106 stores therein information on IDs of articles present in the living environment or the like and article information for article ID estimation that is necessary to estimate an article or the ID of an article, and further, stores therein article IDs having an association with each other, as an example of information on article combinations. FIG. 24 shows an example of the article information database 106 according to the fourth embodiment. In the article information database 106 in FIG. 24, for example, since a mobile phone (ID001) and a wallet (ID002) are always brought out together when going out, they are stored as articles having an association with each other. In addition, since a cold drink is poured into a cup (ID003), the cup is associated with juice (ID020) and mineral water (ID021). Similarly, for other articles too, their respective associated article IDs are stored.

When the search article estimation means 103 receives from the search state detection means 102 a determination result that in a storage equipment where a user makes a search an article that the user is searching for is not present, the search article estimation means 103 estimates an article that should be in the storage equipment but is not currently present in the storage equipment and that, by referring to the article information database 106, is associated with an article that the user is currently holding, to be the article that the user is searching for. Here, for a method of detecting an article held by the user, estimation can be made by the search article estimation means 103 referring to the article location history database 108. For example, a description is made using FIG. 7. A mobile phone (ID001) is taken out of a dining table at 17:20 and is placed on a table at 17:22. During this period of time, the user holds the mobile phone. That is, it can be determined by the search article estimation means 103 that an article whose disappearance is stored in the article location history database 108 and which is not yet detected on any storage equipment is held by the user.

Here, an input apparatus 900 such as a keyboard, a mouse, or a microphone may further be provided to allow a user to manually set the article information database 106 or the like.

According to the fourth embodiment, by the search article estimation means 103 referring to the article information database 106 having stored therein information on article combinations, it becomes possible for the search article estimation means 103 to narrow down from articles associated with an article that a user is currently holding to an article that the user is searching for, whereby more accurate article estimation can be made by the search article estimation means 103.

Fifth Embodiment

Figure 26:
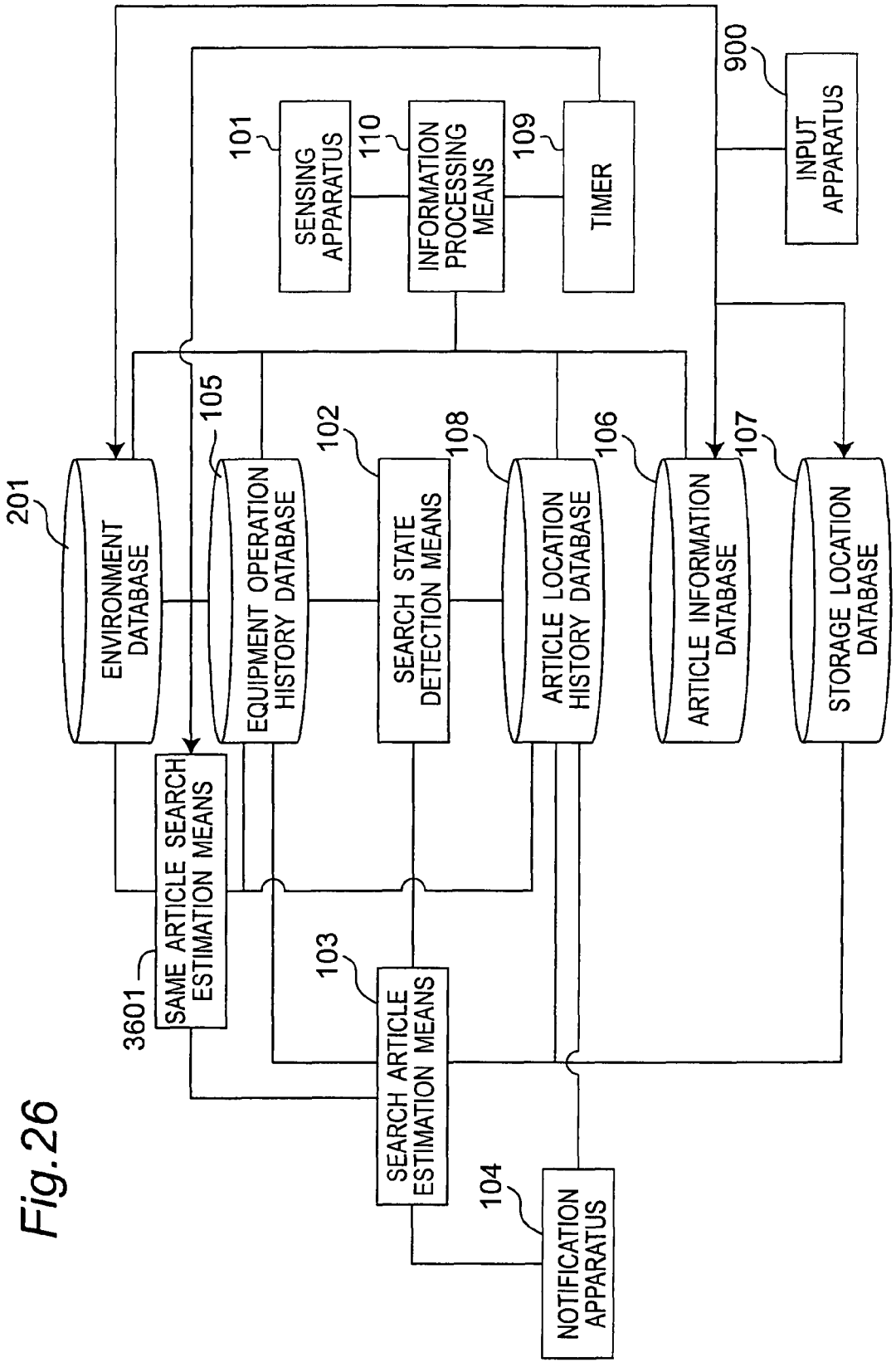
FIG. 26 is a block diagram showing a configuration of a search article estimation apparatus that uses a server according to a fifth embodiment of the present invention.

FIG. 26 is a block diagram showing a search article estimation apparatus according to a fifth embodiment of the present invention.

The search article estimation apparatus is composed of an article information database 106, a storage location database 107, a timer 109, a sensing apparatus 101, an information processing means 110, an article location history database 108, an equipment operation history database 105, an environment database 201, a search state detection means 102, a search article estimation means 103, a notification apparatus 104, and a same article search estimation means 3601. An input apparatus 900 such as a keyboard, a mouse, or a microphone may further be provided to allow a user to manually set the database or the like.

The means, apparatuses, databases, and timer 109 except for the same article search estimation means 3601 have equivalent configuration and functionality to those described in the first embodiment and thus the description thereof will be omitted and the configuration and operation of the same article search estimation means 3601 will be mainly described.

The same article search estimation means 3601 is connected to the equipment operation history database 105, the environment database 201, the article location history database 108, the search article estimation means 103, and the timer 109. The same article search estimation means 3601 determines a period of time from when "close" is stored in the state of a stored equipment until "open" is stored in the state of another storage equipment, by referring to the equipment operation history database 105, the environment database 201, and the article location history database 108, and, if necessary, time information from the timer 109. When it is detected by the sensing apparatus 101 that the period of time is short, no articles are taken out of the first storage equipment (the storage equipment having "close" stored in its state), and no articles are stored in that storage equipment, it is determined by the same article search equipment means 3601 that a user searches the second storage equipment for the same single article.

Here, for a reference for the length of the period of time, for example, the walking speed of the user and the distance between the two storage equipments can be used. For example, given that the average walking speed of the user is 1000 cm/s and information on the average walking speed is stored in an internal storage of the same article search estimation means 3601. Under such circumstances, it is assumed that the first storage equipment (the storage equipment having "close" stored in its state) is a stationery case, the second storage equipment (the storage equipment having "open" stored in its state) is a multipurpose cabinet, the location of the user when searching the stationery case is (2500, 1000), and the location of the user when searching the multipurpose cabinet is (1200, 1500). Note that a method of obtaining a user location is already described using the sensing apparatus 101 in the first embodiment and thus the description thereof will be omitted. When the user searches for the same single article, it can be determined that the user heads from the stationery case directly to the multipurpose cabinet without stopping at any other place. The distance between the stationery case and the multipurpose cabinet is about 1400 cm and a value obtained by dividing 1400 cm by the average walking speed of 1000 cm/s, i.e., 1.4 seconds, can be used as the reference for the length of the period of time.

For example, the same article search estimation means 3601 estimates that the user searches the stationery case and the multipurpose cabinet for the same single article. Thereafter, the fact that no articles are taken out of the multipurpose cabinet and the door is closed at 18:40 without storing any article is detected by the sensing apparatus 101. Then, in response to a result of the estimation made by the same article search estimation means 3601, the search article estimation means 103 estimates an article, i.e., a stapler (ID007), that is not present in both of the stationery case and the multipurpose cabinet (see FIG. 7) and that designates both storage equipments, i.e., the stationery case and the multipurpose cabinet, as its original storage equipments (see FIG. 27) to be the article that the user is searching for.

According to the fifth embodiment, when a user cannot find an article and searches storage equipments at a plurality of locations, it can be estimated by the same article search estimation means 3601 that the article that the user is searching for is an article that is in common between the storage equipments at the plurality of locations where the user has performed a search. Thus, the article that the user is searching for can be more accurately estimated.

Sixth Embodiment

Figure 19:
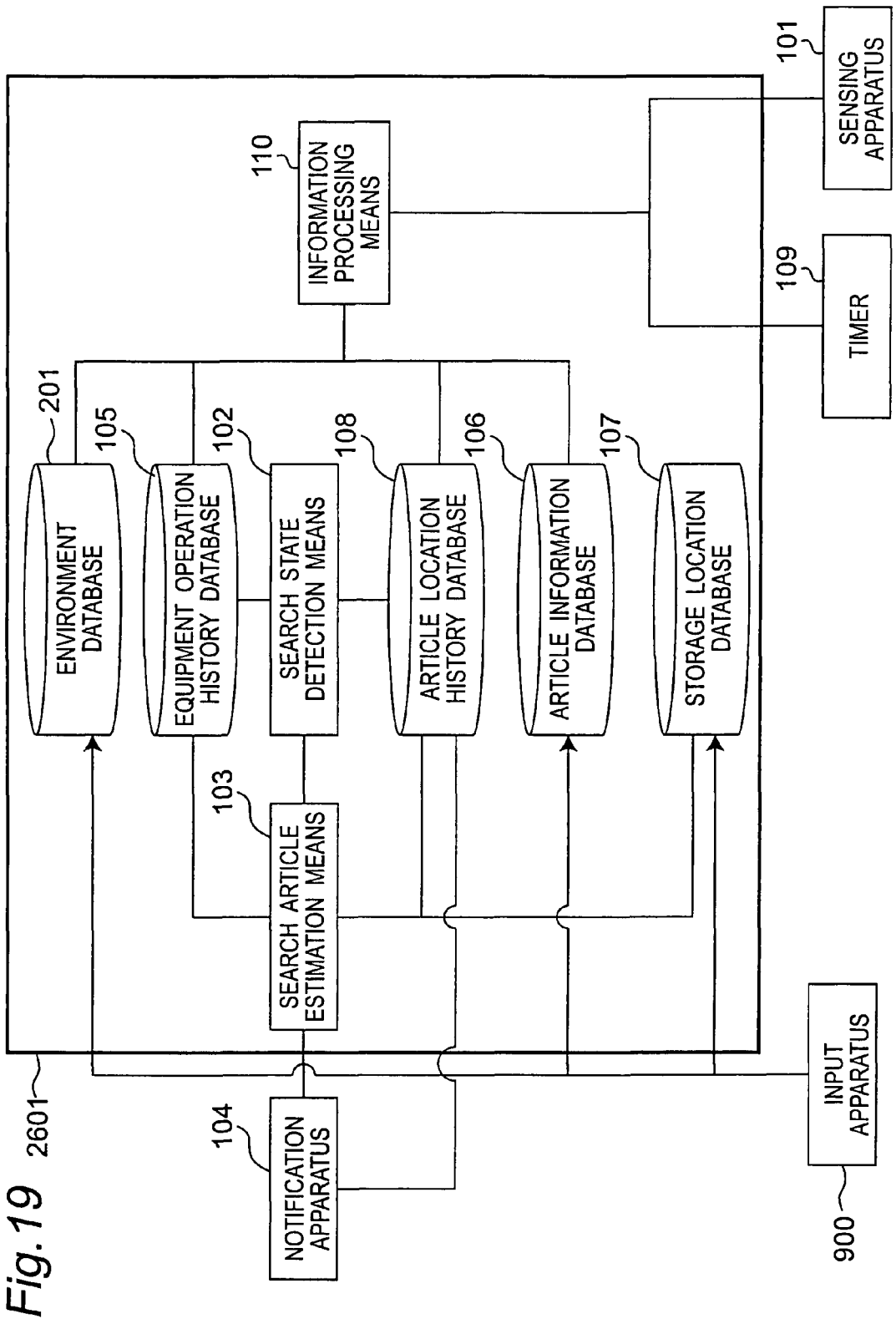
FIG. 19 is a block diagram showing a configuration of a search article estimation apparatus that uses a server for the search article estimation apparatus, according to a sixth embodiment of the present invention.

FIG. 19 is a block diagram showing a search article estimation apparatus that uses a server for the search article estimation apparatus, according to a sixth embodiment of the present invention.

The search article estimation apparatus according to the sixth embodiment is composed of a server 2601 for the search article estimation apparatus, a sensing apparatus 101 connected to an information processing means 110, a timer 109 connected to the information processing means 110, a notification apparatus 104 connected to a search article estimation means 103 and an article location history database 108, and an input apparatus 900.

The server 2601 for the search article estimation apparatus is composed of a search state detection means 102, the search article estimation means 103, an equipment operation history database 105, an article information database 106, a storage location database 107, the article location history database 108, the information processing means 110, and an environment database 201. Access state estimation information that indicates the state of access to a storage equipment by a user and information on change in articles in the storage equipment during the access are received by the information processing means 110 of the server 2601 from the sensing apparatus 101 provided outside the server 2601. Whether an article that the user is searching for is present in the storage equipment is determined by the search state detection means 102 of the server 2601. If it is determined by the search state detection means 102 that the article is not present, then the storage lotion database is further referred to by the search article estimation means 103 of the server 2601, whereby it is estimated by the search article estimation means 103 that an article that should originally be stored in the storage equipment is the article that the user is searching for.

Here, the means, apparatuses, databases, and timer in the block diagram of FIG. 19 are already described in the first embodiment and thus a detailed description thereof will be omitted here.

Figure 20A:
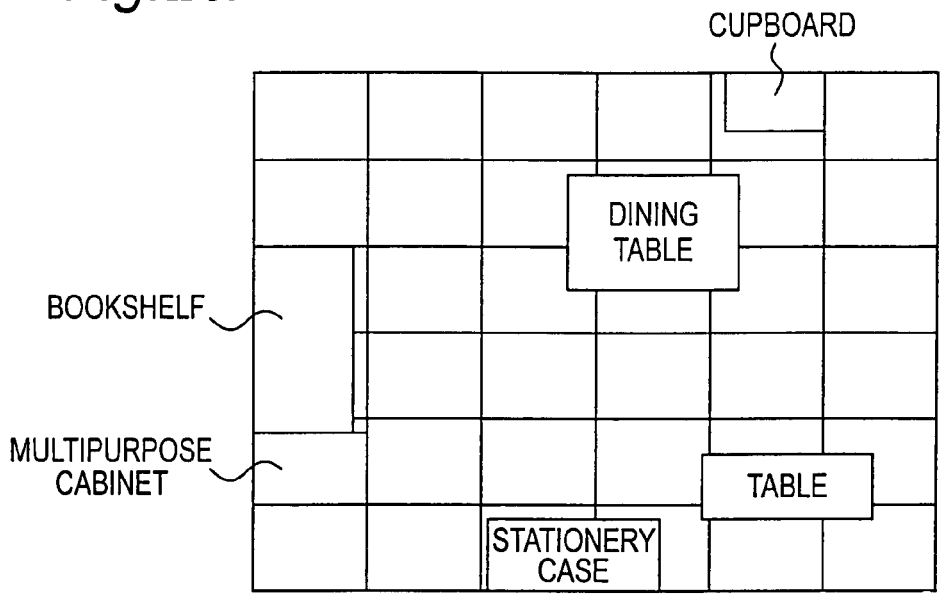
FIG. 20A is an equipment disposition view before disposing a server, sensing apparatuses, and notification apparatuses of the search article estimation apparatus that uses the server for the search article estimation apparatus, according to the sixth embodiment of the present invention.
Figure 20B:
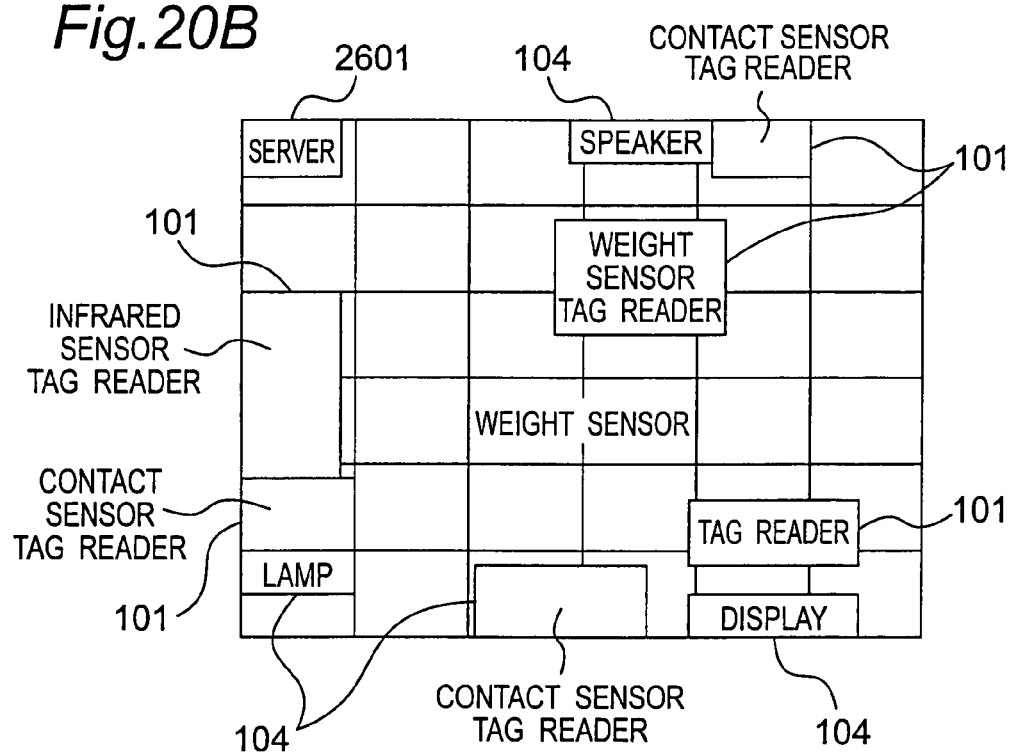
FIG. 20B is a view showing a disposition example of the server, sensing apparatuses, and notification apparatuses of the search article estimation apparatus that uses the server for the search article estimation apparatus, according to the sixth embodiment of the present invention.

Although, as shown in FIG. 20B, the server 2601 is installed in an end of the living environment, the server 2601 may be installed outside the living environment.

For the sensing apparatus 101, a contact sensor that detects opening/closing of a door and a tag reader that detects presence/absence of an article are installed on a cupboard, a weight sensor and a tag reader that detect presence/absence of an article are installed on a dining table, an infrared sensor that detects presence/absence of a hand of a person in a bookshelf and a tag reader that detects presence/absence of an article are installed on the bookshelf, contact sensors that detect opening/closing of a door and a tag reader that detects presence/absence of an article are installed on a multipurpose cabinet, a tag reader that detects presence/absence of an article is installed on a table, contact sensors that detect opening/closing of a door and a tag reader that detects presence/absence of an article are installed on a stationery case, and a weight sensor that detects a person is installed on a floor.

For the notification apparatus 104, a speaker, a lamp, and a display are provided in the living environment.

Here, the sensing apparatus 101, the notification apparatus 104, the input apparatus 900, and the timer 109 are connected to the server 2601 by wire or wirelessly.

According to the sixth embodiment, the server 2601 receives from the sensing apparatus 101 access state estimation information that indicates the state of access to a storage equipment by a user and information on change in articles in the storage equipment during the access. Whether an article that the user is searching for is present in the storage equipment is determined by the search state detection means 102 of the server 2601. If it is determined by the search state detection means 102 that the article is not present, then the storage lotion database 107 of the server 2601 is further referred to by the search article estimation means 103 of the server 2601, whereby it is estimated by the search article estimation means 103 that an article that should originally be stored in the storage equipment is the article that the user is searching for. Since information on the location of the estimated article is notified to the user by the notification apparatus 104, the user can know the information on the location of the article being currently searched for, without making a purposefully input to the search article estimation apparatus. In addition, since the server 2601 does not need to be installed in the living environment of the user, if, for example, the server 2601 is installed at an external administration agency or the like, there only need to install, in the living environment of the user, the sensing apparatus 101, the timer 109, the notification apparatus 104, and the input apparatus 900.

By properly combining the arbitrary embodiments of the aforementioned various embodiments, the effects possessed by the embodiments can be produced.

The search article estimation apparatus and method and the server for the search article estimation apparatus of the present invention do not require a purposeful input when a user searches for an article, and thus, are useful for an article search in an environment where there are a large number of articles, such as at home or in an office.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A search article estimation method comprising:

detecting at least, by a sensing apparatus disposed in a living environment, article location information by which a location of an article can be estimated, and access state estimation information by which a state of access to a storage equipment by a user can be estimated;

obtaining, from an environment database that stores therein the detected article location information and access state estimation information and a map of the environment and installation locations of the storage equipment and the sensing apparatus which are disposed in the environment, a current location of the article and the access state information that indicates the state of access to the storage equipment by the user;

detecting by a search state detection means, when the user searches for the article by the access to the storage equipment, whether there is a change in presence/absence of article ID information in the storage equipment between when the access to the storage equipment is started and when the access to the storage equipment ends; and estimating the article the user is searching for a search article estimation means when the search state detection means detects that there is no change in the presence/absence of the article ID information, by obtaining ID information of an article which original storage location is the storage equipment, by referring to the storage location database in which a name or an installation coordinate of the storage equipment which is the storage location of the article, is associated with locations on the ID information of the article ID therein, then, narrowing down, by referring to the article location history database, from the obtained ID information of the article, to an article with article ID information that is not currently present at its original storage location, and then estimating the narrowed-down article to be the article that the user is searching for.

* * * * *

UNITED STATES PATENT AND TRADEMARK OFFICE
CERTIFICATE OF CORRECTION

| | | |
|---|---|---|
| PATENT NO. | : 8,099,427 B2 | |
| APPLICATION NO. | : 11/796723 | |
| DATED | : January 17, 2012 | |
| INVENTOR(S) | : Toru Tanigawa et al. | |

It is certified that error appears in the above-identified patent and that said Letters Patent is hereby corrected as shown below:

In column 30, line 22, claim 1, the word --using-- should be inserted between the words "for" and "a".

In column 30, line 31, claim 1, the phrase --to store the name or the installation coordinate and the information of the article-- should be inserted between the words "article" and "ID".

Signed and Sealed this
Twenty-ninth Day of May, 2012

David J. Kappos
*Director of the United States Patent and Trademark Office*